US007756489B2

(12) United States Patent
Ishikawa et al.

(10) Patent No.: US 7,756,489 B2
(45) Date of Patent: Jul. 13, 2010

(54) SOFTWARE DEFINED RADIO AND LIBRARY CONFIGURATION THEREFOR

(75) Inventors: Takashi Ishikawa, Kokubunji (JP);
Manabu Kawabe, Hachioji (JP);
Katsuhiko Tsunehara, Hachioji (JP);
Hirotake Ishii, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 1088 days.

(21) Appl. No.: 11/349,199

(22) Filed: Feb. 8, 2006

(65) Prior Publication Data

US 2006/0199550 A1 Sep. 7, 2006

(30) Foreign Application Priority Data

Mar. 4, 2005 (JP) ............................. 2005-059857

(51) Int. Cl.
*H04B 1/40* (2006.01)
(52) U.S. Cl. .................. 455/84; 455/550.1; 455/230; 713/600; 713/500; 713/300; 710/104; 710/8
(58) Field of Classification Search .................. 455/84, 455/550.1, 230; 713/600, 500, 300; 710/104, 710/8
See application file for complete search history.

(56) References Cited

U.S. PATENT DOCUMENTS

| | | | |
|---|---|---|---|
| 7,139,921 B2 * | 11/2006 | Sherburne, Jr. | ............. 713/322 |
| 2003/0181218 A1 | 9/2003 | Mukai et al. | |
| 2005/0272464 A1 | 12/2005 | Ishikawa et al. | |
| 2006/0035603 A1 * | 2/2006 | Al-Adnani | ................ 455/90.2 |

FOREIGN PATENT DOCUMENTS

| | | |
|---|---|---|
| JP | 2002-544704 | 5/2000 |
| JP | 2002-135158 | 10/2000 |
| JP | 2003-218731 | 1/2002 |
| JP | 2004-40256 | 6/2002 |
| JP | 2004-334735 | 5/2003 |
| WO | WO 00/69084 | 5/2000 |

OTHER PUBLICATIONS

Kawabe, Manabu, et al., "A Study on Software Defined Radio (2)—Software Library", IEICE Communications Society, 2004 General Conference Transactions, B-17-7, Sep. 23, 2004, pp. 1-4, in Japanese with English translation.
U.S. Appl. No. 11/209,713, filed Aug. 24, 2005, Tsunehara, et al.
U.S. Appl. No. 11/218,484, filed Sep. 6, 2005, Kawabe, et al.
Office Action from Japanese Patent Office mailed Nov. 17, 2009.

* cited by examiner

*Primary Examiner*—Patrick N Edouard
*Assistant Examiner*—Aung Win
(74) *Attorney, Agent, or Firm*—Stites & Harbison PLLC; Juan Carlos A. Marquez, Esq.

(57) ABSTRACT

A radio communication apparatus having a radio modem for processing a signal in a radio frequency band, a signal processor for processing a base band of a transmission or reception signal, and a CPU for processing a protocol. The signal processor includes signal processing blocks implemented by programmable software. Each of the signal processing blocks processes a signal of reception signal data input from the radio modem or from a preceding stage of one of the signal processing blocks or a signal of transmission signal data input from the CPU or from the preceding stage of signal processing block on the basis of a control signal input together with the transmission signal data or the reception signal data. The control signal can include information required by all the signal processing blocks in a common format.

6 Claims, 17 Drawing Sheets

SOFTWARE DEFINED RADIO AND LIBRARY CONFIGURATION THEREFOR

INCORPORATION BY REFERENCE

The present application claims priority from Japanese application JP 2005-059857 filed on Mar. 4, 2005, the content of which is hereby incorporated by reference into this application.

CROSS-REFERENCE TO RELATED APPLICATIONS

The present application relates to subject matters described in U.S. patent application publication No. 2005/0272464A1 (application Ser. No. 11/097,293 filed on Apr. 4, 2005) assigned to the assignee of the present application, application Ser. No. 11/209,713 filed on Aug. 24, 2005 assigned to the assignee of the present application, and application Ser. No. 11/218,484 filed on Sep. 6, 2005 assigned to the assignee of the present application. The disclosures of these applications are incorporated herein by reference.

BACKGROUND OF THE INVENTION

The present invention relates to a software defined radio in which a software library is controlled by distributed control scheme.

As broadband communication is spread, the diversity of communication system is quickly increasing even in a radio communication field. Such a tendency increases the need for a seamless wireless communication service by which the most suitable wireless systems are selected according to conditions including a communication purpose and a communication environment to achieve free data transfer between the wireless systems. For example, in the telematics service, a review is directed to the use of cellular system and wireless LAN; for the purpose of connecting a vehicle with the Internet, the employment of ETC (electronic toll collection) system for automatic toll payment, the use of near field communication for communication within a vehicle, and further the employment of digital terrestrial broadcasting system for viewing or listening to a television or radio. With the frequent modification or function addition of an existing communication system, the need for a radio facilitating the later system modification, function addition or defect correction has been spread, in particular, in infrastructure equipment including a base station as its representative.

As one of techniques for satisfying such a demand, there is a software defined radio technique. A software defined radio based on the technique processes signals for radio communication with use of a processor having a high processing capability and a reconfigurable digital signal processing device. When a DSP or a CPU is employed as the processor, software having the contents of the processed signals described therein is stored in a storage device such as a memory. The processor performs its signal processing operation by reading the software therein from the storage device. Various signal processing operations can be realized by modifying the description of the software or by exchanging the software. When an FPGA (Field Programmable Gate Array) is used as the reconfigurable device, configuration data having placement/routing information for desired signal processing is stored in the storage device such as a memory. The reconfigurable device can realize the signal processing by reconfiguring the placement and routing on the basis of the configuration data stored in the storage device.

For the purpose of using the software defined radio for a plurality of communication systems, when such the programmable processor, reconfigurable device, etc. having a general versatility as mentioned above are prepared as its hardware, the software defined radio can be commonly used for the plurality of communication systems. With respect to its software, on the other hand, the number of pieces of software is required to correspond to a desired number of such communication systems to be realized. When it is desired to realize the radio in the form of exclusive hardware, complicated LSI design is required and an enormous amount of time is required for its realization. Since the software defined radio can use the hardware commonly, it is only required to design the software. However, in general, a considerable amount of time is required even for software design.

Most of the items of signal processing carried out in the radio are carried out commonly by the communication systems. For example, modulation/demodulation, spreading, encoding, scrambling, CRC, etc. are not operations unique to a specific communication system but signal processing operations required by most communication systems. For this reason, it is considered to form these signal processing operations into software libraries as units to be commonly used to the communication systems. The communication system can be realized by a combination of these unit libraries. Since the library is software, hardware for realizing the processing operation is required. When a processor is used, the library has a program for realizing each processing operation described therein. When a reconfigurable device is used, the library is configuration data having placement/routing information for realizing each processing. The processing can be implemented by reconfiguring the placement and routing of the reconfigurable device. The required communication system can be realized in the form of a combination of the signal processing libraries, thus eliminating the need for designing the software from its beginning.

In a conventional exclusive radio apparatus, signal processing blocks for realizing these library processing operations are centralizedly controlled. FIG. 1 schematically shows a centralized control system. In FIG. 1, signal processing blocks 102 to 105 perform unit processing operations of modulation/demodulation, spreading, encoding, etc. In the centralized control system, a timing controller 101 for collectively controlling the timing of the signal processing blocks 102 to 105 is necessary. In a software defined radio to which the control method is applied, each of the signal processing blocks 102 to 105 is formed as a reconfigurable device or the like. The signal processing blocks 102 to 105 are subjected to placement and routing on the basis of the configuration data having the library operation (such as modulation/demodulation, spreading or encoding) desired in the corresponding signal processing block described therein. In the centralized control system, consider now a case where it is desired to change a certain part of the library. When the change of the library is carried out, it is required to change not only the library but also the timing controller for controlling the library in question. In addition, it is inevitably required to also change the libraries belonging to the timing controller other than the corresponding library. As a result, it is necessary to rewrite the entire software and thus the benefit of the librarization cannot be taken.

In view of such a problem, a system for distributedly controlling libraries is considered. In this control system, the signal processing blocks having the signal processing libraries installed therein have a common interface. Data input/output are carried out synchronously with a clock signal together with control information indicate of a data type.

Since timing information is transmitted as control information simultaneously with data, the need for provision of a timing centralized controller can be avoided and the signal processing blocks can perform their timing control independently of each other. So long as data input/output between the signal processing blocks are synchronized, it is unnecessary to synchronize the operations of function parts. Thus the independency of each signal processing block can be secured and the control of the libraries can be based on distributed control. An example of a system for distributed control of libraries is disclosed in "A study on Software Defined Radio (2)-Software Library-", Manabu Kawabe, et al., IEICE Communications Society, 2004 General Conference Transactions, B-17-7, released on Sep. 23, 2004.

SUMMARY OF THE INVENTION

When libraries are controlled by distributed control, the formation of a common interface is essential. However, only by preparing the common interface, a flexibility or scalability in the connection between the libraries such as addition, deletion, exchange, etc. of a library cannot be secured to a sufficient extent. In the centralized control system, the control signal can be directly obtained at necessary timing from the centralized controller. In the distributed control system, on the other hand, the control signal is transmitted between the libraries together with data and sent down to the necessary signal processing library. In other words, in the software defined radio based on the distributed control system, it is necessary to transfer, together with data, the control signal indicative of a timing signal or the like generated in the signal processing library to and from the other library. In the receiver side, it is necessary to receive a high frequency receive signal, process it according to the specifications of the corresponding communication system, extract correct receive data therefrom, and transmit it to all the libraries and finally to the CPU while the control signal is not extinguished. In the transmission side, it is necessary to process desired transmission data according to the specifications of the communication system, transmit the processed data to all the libraries and transmit the control signal without extinguishing until the transmission signal of the high frequency is output. This is a first problem to be solved.

In order to transmit the control signal without extinguishing it at the signal processing libraries on the way, it is basically necessary to exclusively prepare control bits for all the control signals used in the signal processing libraries. FIG. 2 shows an example of control bit allocation in libraries. Explanation will now be made as to how to transmit a control signal FIG. 2. A library A 201 receives control signals from control bits b0, b1, performs its signal processing operation, and outputs a generated control signal from a control bit b2. A library B 202 receives the control signal generated in the library A from the control bit b2, performs its signal processing, and outputs control signals from control bits b3, b4. A library C 203 receives the control signal generated in the library B 202 at a control bit b3. A library C 203 receives the control signal at a control bit b2. The received control signal is generated in the library A 201, not processed in the library B 202, output as it is without any processing therein, and transmitted to the library C 203. The library C 203 performs its signal processing using these control signals, and outputs a control signal from a control bit b5. Since the library C 203 passes the control signal b4 generated in the library B 202 to its downstream side, it is necessary not to assign a new control signal to the control bit b4 but to put the control bit in an idle state. Thus a problem takes place, when the above control signal assigning method and control signal transmitting method are used, when the library is shared by a plurality of systems, when the library is exchanged, or when the library is used several times in the same system. For example, when the library A is used several times, the library A when used for the second time is assumed to want to use the control signal b3 generated in the library B and the control signal b5 generated in the library C. In the library A used for the first time, however, control signal bits are assigned so that the control signals are received at the control bits b0 and b1 and the control signal is output from the control bit b2. In order to provide a common interface, such works as exchange, conversion, etc. of the control signal becomes necessary.

Explanation will be made in connection with a specific example. CRC (Cyclic Redundancy Check) may be enumerated as the library A. The CRC library is assumed to have an interface which receives at the control bit b0 the control signal indicative of the head of data for computation and at the control bit b1 the control signal indicative of the tail of the data and which outputs a control signal b2 indicative of the tail of an added code. It is also assumed in a communication system that a control signal indicative of the head of a header 1 is exclusively assigned to the control bit b0, a control signal indicative of the tail of the header 1 is exclusively assigned to the control bit b1, a control signal indicative of the head of a header 2 is exclusively assigned to a control bit b3, and a control signal indicative of the tail of the header 2 is exclusively assigned to a control bit b5. It is further assumed in the communication system that a CRC code is attached to each of the header 1 and 2. In this system, it is necessary for the CRC library appearing for the first time to receive the control signals b0 and b1 and for the CRC library appearing for the second time to receive the control signals b3 and b5. However, since the CRC library has an interface which receives the head and tail of the data at the control bits b0 and b1, the library appearing for the second time cannot receive correct control information. The CRC library appearing for the second time undesirably receives the head and tail of the header 1 not the header 2.

As mentioned above, when a library having a common interface is used a plurality of times in the same system, a problem with how to assign the control signal to the bit takes place. When it is desired to add another library between libraries, for example, when it is desired to add a library E between the libraries B and C in FIG. 1; works such as exchange, conversion, etc. of the control signal are required similarly to the above case. A problem with he above exchange, conversion, etc. of the control signal is a second problem to be solved.

The software defined radio becomes larger in arrangement size than a radio made in the form of exclusive hardware by an amount corresponding to its general versatility possession. When communication system software is realized in the form of a combination of libraries having a common interface, the software becomes greater in design size than software exclusive to the communication system. To avoid this, it is necessary to provide a general versatility sufficient to realize a software defined radio and to minimize the installing scale for realizing signal processing. The above problem with the installing scale is a third problem to be solved.

In the software defined radio in accordance with the present invention, signal processing libraries have input/output control signals of an identical format, and a signal processing library core for performing essential operation associated with the radio communication of the signal processing library has a basic arrangement independent of signal processing libraries located upstream and downstream thereof.

A first arrangement for solving the aforementioned first problem is featured in that, in the above basic arrangement, a signal processing library has an interface wherein all control signals necessary for wireless communication processing are assigned to exclusive bits.

A second arrangement for solving the aforementioned first problem and having a high flexibility in the connection between libraries is featured in that, in its basic arrangement, a signal processing library has an interface wherein control signals necessary for wireless communication processing are exclusively positioned in a control bit array and also has a means for repositioning the control signals necessary for a signal processing library core.

A third arrangement for solving the first problem, having a high flexibility in the connection between libraries, and solving the second problem; is featured in that, its basic arrangement, a signal processing library has a means for converting a control signal issued from a signal processing library core to an identifier having a specific meaning on wireless communication and also has a means for converting an identifier input to the signal processing library to a control signal necessary for the signal processing library core.

In this connection, a section for implementing a means for repositioning control signals, the means for converting the control signal to the identifier, and the means for converting the identifier to the control signal; will be referred to as a format processor, hereinafter.

In the first arrangement of the present invention, the same library is not used a plurality of times in the same system, and when the use order of libraries can be previously predicted, the exchange, insertion and deletion of a library can be realized without modifying the library core for performing essential processing operation of the library. In the second arrangement; the exchange, insertion and deletion of a library can be realized even under conditions excluded in the first arrangement. In this way, a flexibility in the connection between libraries can be secured as a first effect. In the third arrangement, the number of control signals between libraries can be reduced, in addition to the first effect. A fourth arrangement can have the structure of a selector smaller in size than that in the second arrangement. A fifth arrangement can have the structures of a converter and an inverter smaller in size than those in the third arrangement. Thus the reduction of the installation scale can be realized as a second effect. Due to the first effect, the radio communication system can be realized in the form of a combination of libraries having a high reusability, the number of steps of developing the software defined radio can be reduced, and its cost can be decreased. Due to the second effect, an increase in the scale involved by versatilization can be minimized, and application to a car-mounted terminal or a radio base station can be realized.

Other objects, features and advantages of the invention will become apparent from the following description of the embodiments of the invention taken in conjunction with the accompanying drawings.

DESCRIPTION OF THE EMBODIMENTS

Arrangements for embodying the present invention will be explained with reference to the accompanying drawings, but the present invention is not limited to the specific examples.

Figure 3:
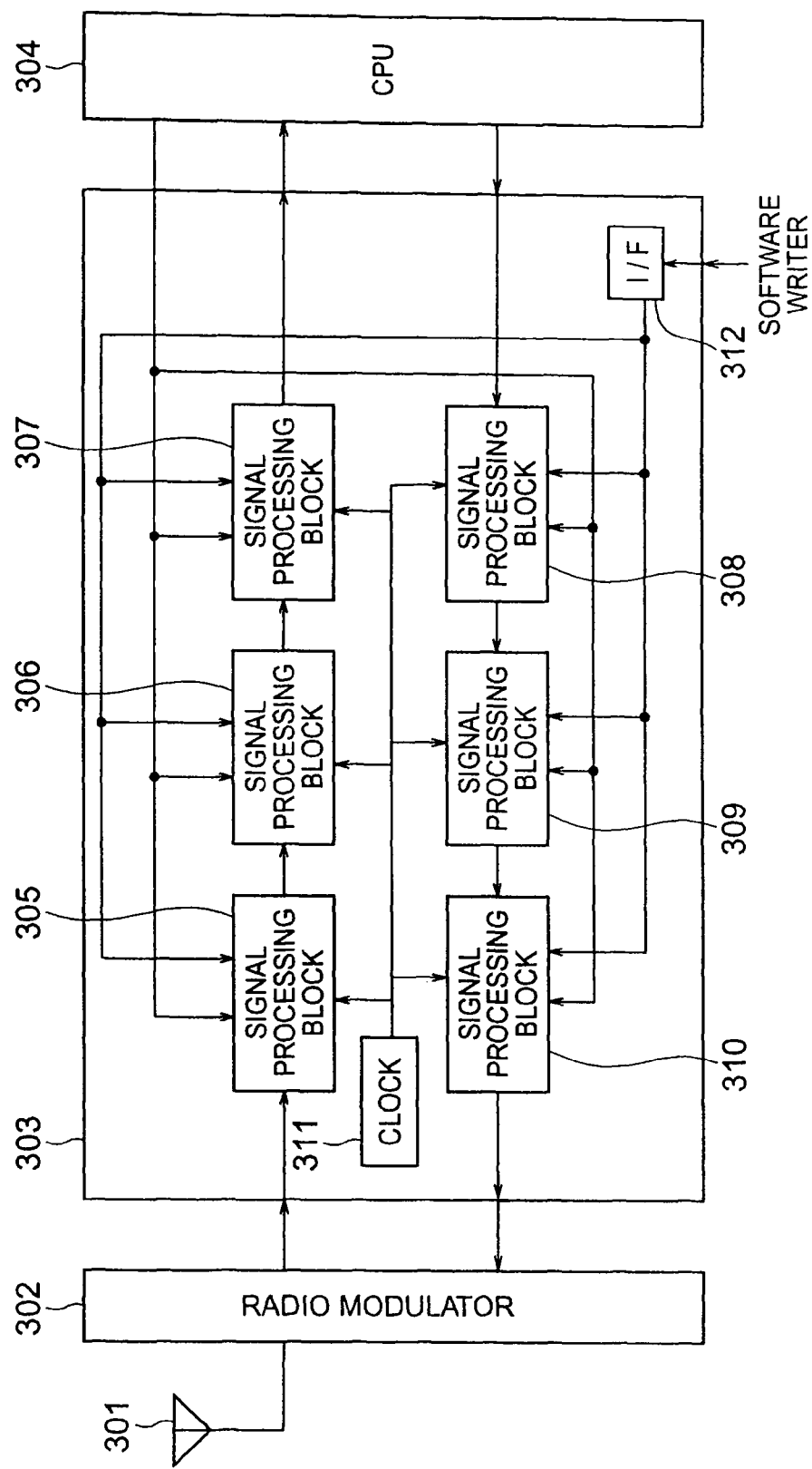
FIG. 3 shows an example of an arrangement of a software defined radio.

FIG. 3 shows an embodiment of an arrangement of a software defined radio in accordance with the present invention. The software defined radio includes an antenna 301, a radio modulator/demodulator (radio modem) 302, a digital signal processor 303, and a CPU 304. A signal having a radio frequency band received at the antenna 301 is input to the radio modem 302, which in turn converts the received signal to a signal having frequencies in a base band or an IF band. The frequency-converted signal is then sent to the digital signal processor 303 where the signal is subjected to base band signal processing and so on. At the CPU 304, protocol processing of the radio communication system is carried out. Transmission data issued from the CPU 304 is converted by the digital signal processor 303 to a signal conforming to the radio system, converted by the radio modem 302 to a signal of the radio frequency band necessary for the communication system, and then output from the antenna 301. A plurality of antennas 301 and the radio modems 302 may be required depending on the number of communication systems desired to be implemented in the form of a software defined radio. In such a case, a switch for suitably switching between the antennas 301 and the radio modems 302 becomes necessary. Such antennas 301 and radio modems 302 having a broad band or a variable frequency as capable of being shared by a plurality of communication systems may be used. And the digital signal processor 303 may perform not only base band signal processing operation but also IF band signal processing operation.

The digital signal processor 303 has signal processing blocks 305 to 310, a clock 311, and an interface 312 with a software writer. The signal processing blocks 305 to 310, each of which comprises a reconfigurable device or a DSP such as an FPGA, install a library input from the software writer via the interface 312 and perform digital signal processing operation. Each library is software in which small units of radio signal processing operations including spread, despread, modulation, demodulation, CRC, scramble, and FIR filter are described. Since the signal processing blocks 305 to 310 are configured on the basis of the configuration data describing placement/routing information for the signal processing of each library, such a reconfigurable device as an FPGA realizes the signal processing operation of each library. Such a processor as a DSP performs the signal processing operation of each library by executing a program for the signal processing of each library. The transmission data input to the digital signal processor 303 from the CPU 304 is sent to the signal processing blocks sequentially from their right side in synchronism with the clock 311, and subjected to signal processing operation by each signal processing block. A signal output from the final stage of signal processing block 310 is sent to the radio modem 302. A reception signal sent from the radio modem 302 to the digital signal processor 303 is sent to the signal processing blocks 305 to 307 sequentially from their left side in synchronism with the clock 311, subjected to signal processing operation by each of the signal processing blocks 305 to 307, and then sent to the CPU 304 from the last stage of signal processing block 307.

The data transmission and reception of the communication system realized in the form of the software defined radio can be carried out by downloading a library necessary for the communication system from the software writer via the interface 312 and installing the library to each of the signal processing blocks 305 to 310 in a suitable order. Not only the library is configured to be installed to the signal processing blocks 305 to 310 directly from the software writer, but also the library may be configured to be downloaded in a memory provided in the digital signal processor 303 and to be installed to the signal processing blocks 305 to 310 from the memory as necessary under control of an instruction from the CPU 304. Though six of the signal processing blocks are illustrated in this example, such signal processing blocks are required actually by a number corresponding to signal processing libraries necessary for realizing the communication system.

Embodiment 1

Figure 4:
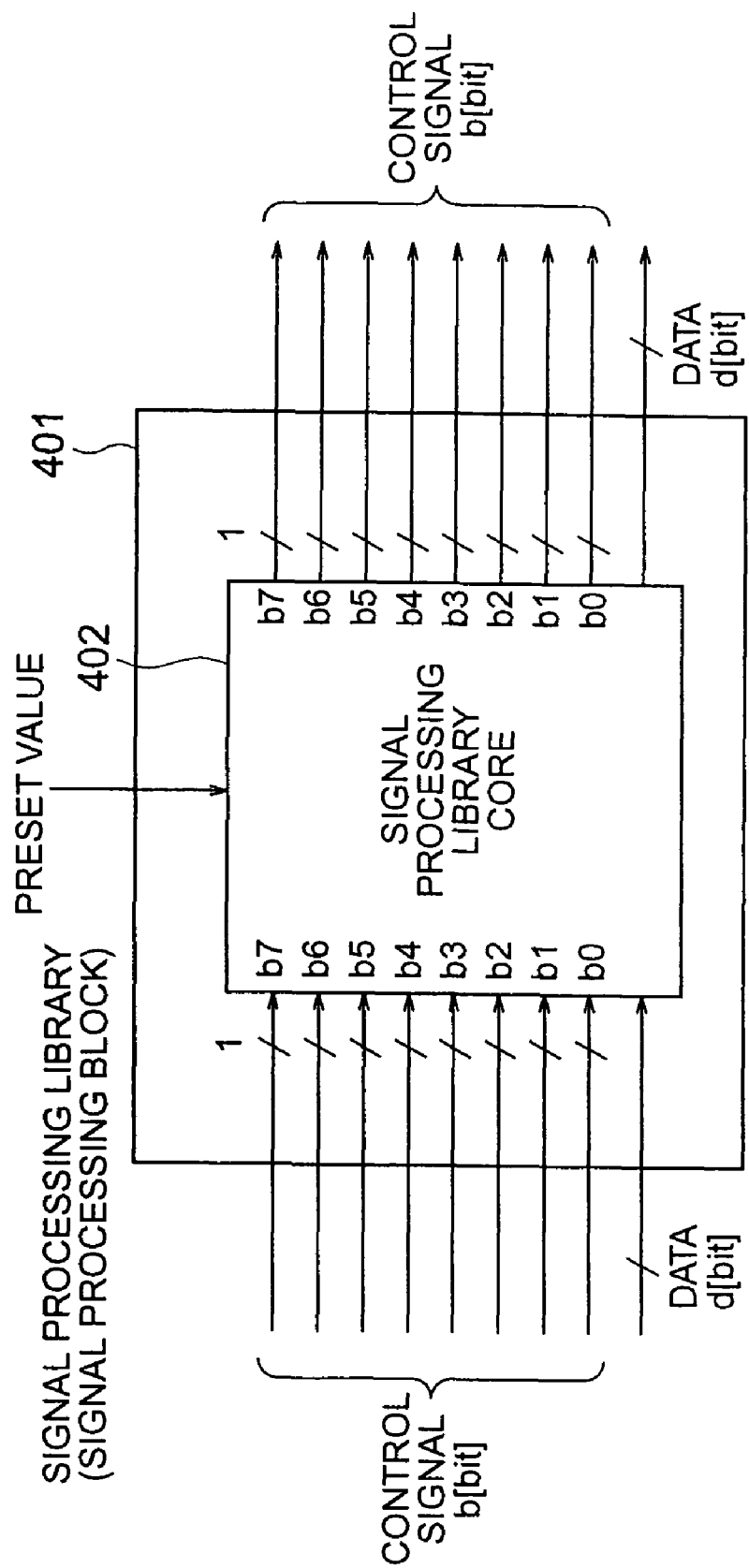
FIG. 4 is a first arrangement of a signal processing library.

FIG. 4 shows a first arrangement of a signal processing library to be installed to each signal processing block, which library can solve the first problem. The signal processing blocks 305 to 310 in FIG. 3 are configured and wired on the basis of the configuration data described in the signal processing library. It is assumed that a single signal processing library is basically realized in the form of a single signal processing block. In this arrangement, data is input to the signal processing library 401 together with a control signal indicative of control information on the data. The signal processing library 401 includes a signal processing library core 402. The signal processing library core performs essential part of the signal processing operation to be desirably realized by the library; and does not generate the control signal, nor reposition the control bits of the control signal, which are not the essential part thereof. For example, modulation is carried out by mapping input data on an IQ plane and outputting IQ data. The signal processing library core 402 performs only such essential signal processing operation necessary for the modulation. In this arrangement, exchange of the control signal is unnecessary and thus the signal processing library is formed only by the signal processing library core for performing the essential operation.

The control signal is a flag signal indicative of start, end, etc. of the operation of each signal processing library. The control signal is an assembly of 1-bit signal lines. And a single piece of information "0" or "1" can be represented by 1 bit. The control signal used in this arrangement example consists of 8 bits and thus control can be carried out by the control signal using 8 pieces of information. When timing information is transmitted as the control signal in synchronism with the data, the respective signal processing blocks can independently perform timing control without provision of a timing centralized controller. That is, distributed control can be realized.

Figure 1:
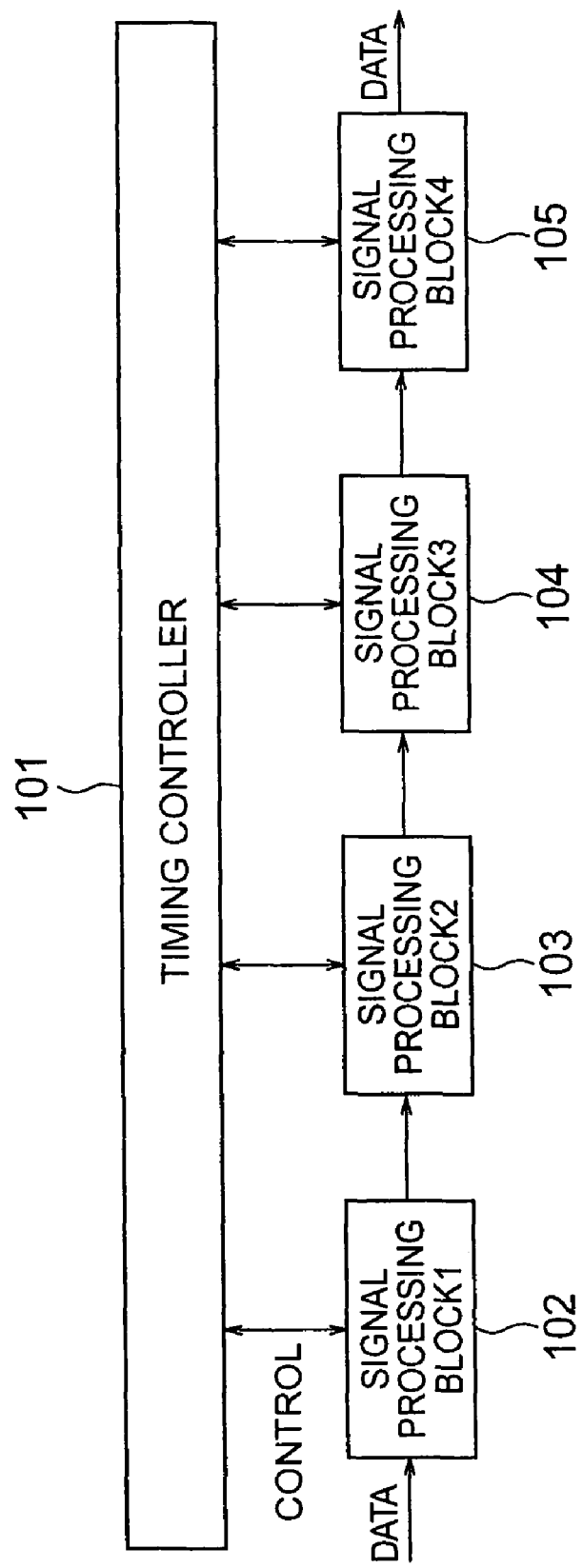
FIG. 1 schematically shows a centralized control system.
Figure 2:
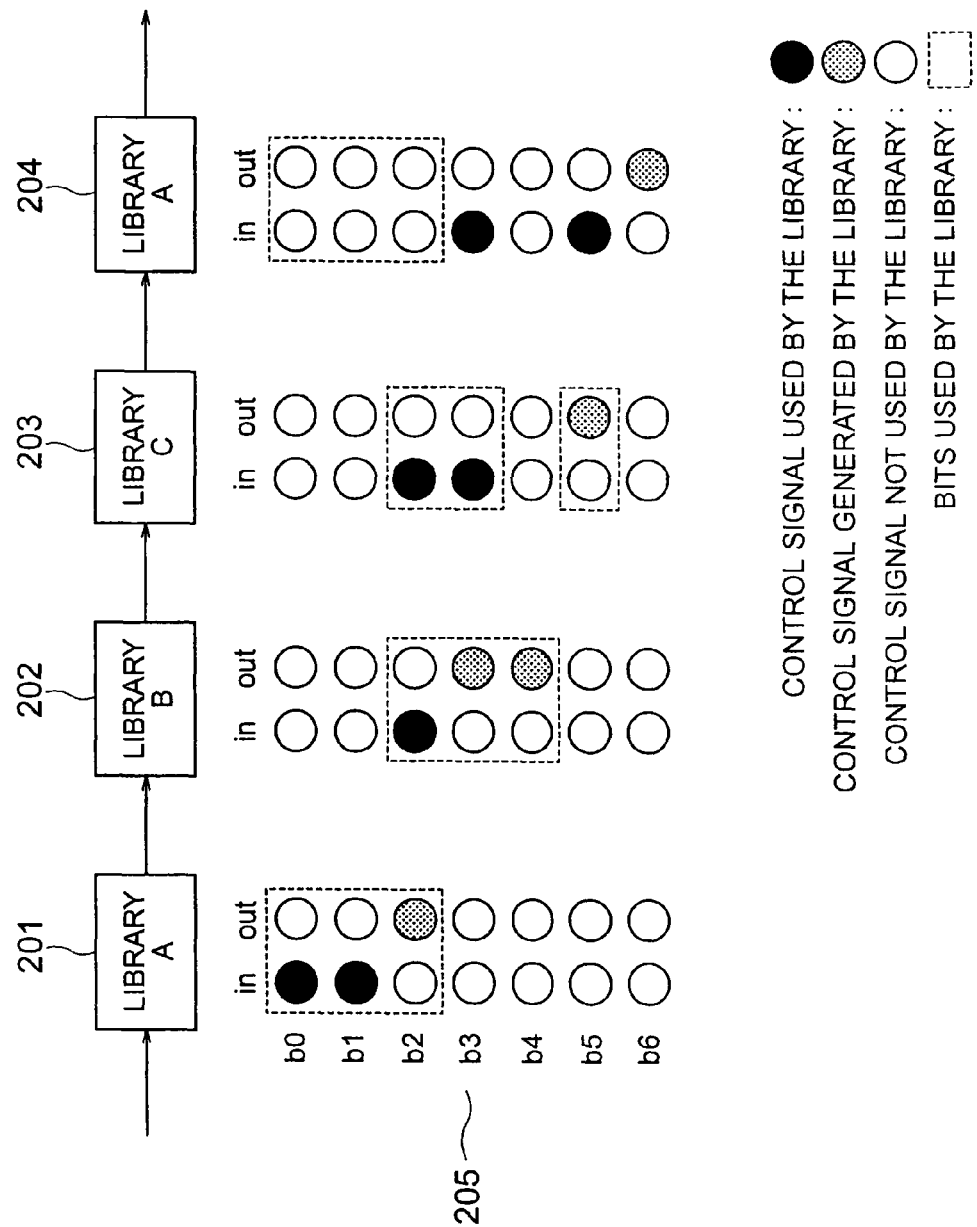
FIG. 2 shows an example of assigning control bits.
Figure 5:
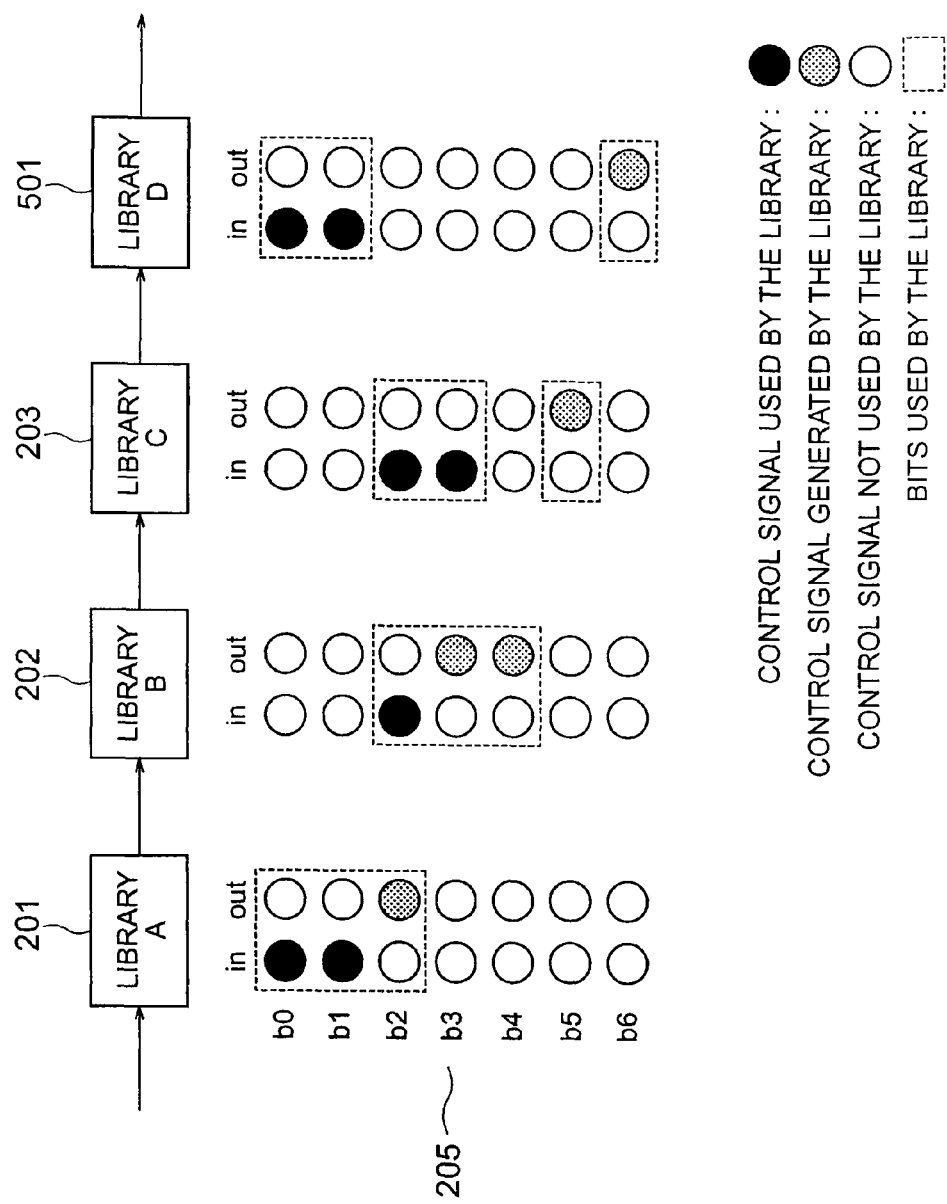
FIG. 5 is an example of assigning control bits in the first arrangement.

FIG. 5 shows an example of assigning control bits. A method for transmitting a control signal is shown in FIG. 5. The explanation as far as the library C 203 is the same as the explanation in FIG. 2. In FIG. 5, a library D 501 receives the control signals b0, b1 generated in the library A 201, performs its signal processing operation, and then outputs a control signal generated therein from a control bit 6. The libraries B 202 and C 203 do not use the control bits b0 and b1. Since the libraries B 202 and C 203 are required to transmit the control signals b0 and b1 down to the library D 501, however, new information cannot be assigned to the control bits b0 and b1 of the libraries B 202 and C 203. If new control information is assigned to the control bits b0 and b1, then the control signal b0 or b1 issued from the library A 201 is overwritten thereon with a control signal having other information. This results in that the correct control signals cannot be transmitted to the library D 501. In other words, the control signal having a certain meaning cannot be overwritten with the control signal having another meaning. It is required that all control signals to be used for the communication system be exclusively prepared at the input/output of each library. With such an arrangement, the control signal can be transmitted between the libraries while not being extinguished.

In this manner, the signal processing libraries having the first arrangement can secure a flexibility in the connection between the libraries. That is, the first problem with the connection flexibility can be solved. In this arrangement, the same library cannot be used a plurality of times within the same system. Thus this arrangement is considered to be effective when the use order of libraries can be previously estimated.

Embodiment 2

Figure 6:
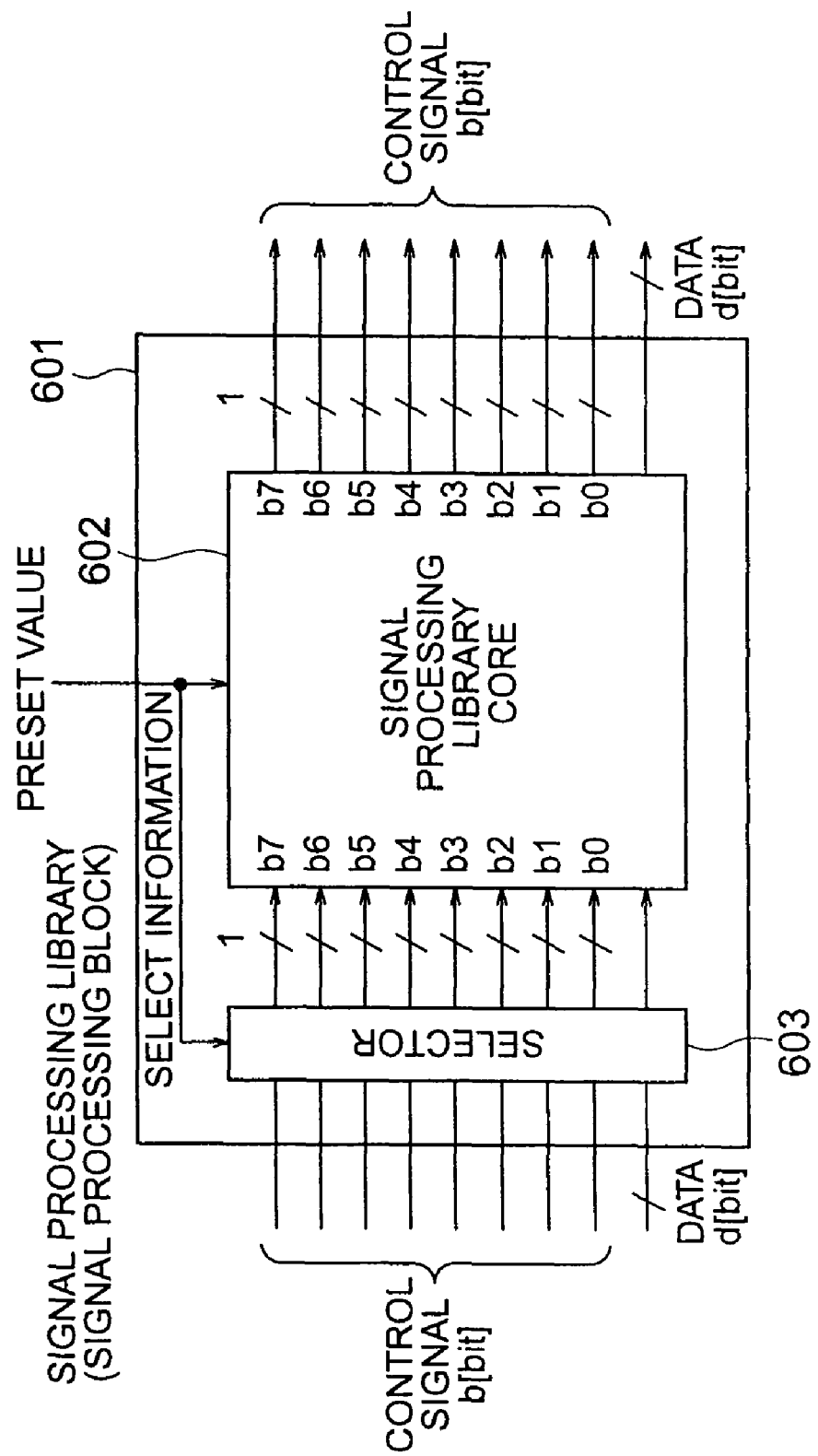
FIG. 6 is a second arrangement of the signal processing library.

FIG. 6 shows a second arrangement of the signal processing library to be installed to each of the signal processing blocks 305 to 310. This arrangement corresponds to the first arrangement, except that a selector 603 is added in the signal processing library of the first arrangement. The selector 603 is formed on such a reconfigurable device as an FPGA similarly to a signal processing library core 602. In this arrangement, data is input to a signal processing library 601 together with a communication system indicative of control information on the data. The control bits of the control signal received at the signal processing library are repositioned at the selector 603 into a control bit array necessary for the signal processing library core. Linking between the control signals at the input and output of the selector is carried out based on select information. Although the selector 603 is placed on the upstream side of the signal processing library core 602 in this example, it may be placed on the downstream side of the signal processing library core 602.

The select information for the control bit repositioning to be carried out by the selector is designed when each signal processing library is installed to each signal processing block, and is set in the FPGA when the library is installed. More specifically, the select information is set, for example, on the basis of the fact that control bits necessary for the library of the corresponding signal processing block are to be included in which bits of the control signal transmitted from the preceding stage of signal processing block and that the control bits necessary for the corresponding library are to be input to the corresponding library core at which bit position. According to this method, when reconfiguration is carried out on a signal processing block, it is only required to set an existing library core and reconfiguring select information for the signal processing block and to again set only the select information as necessary for the other signal processing blocks. Since it is unnecessary to modify the library core for performing most of the operation to be carried out by the signal processing block, library exchange, etc. can be facilitated.

Figure 7:
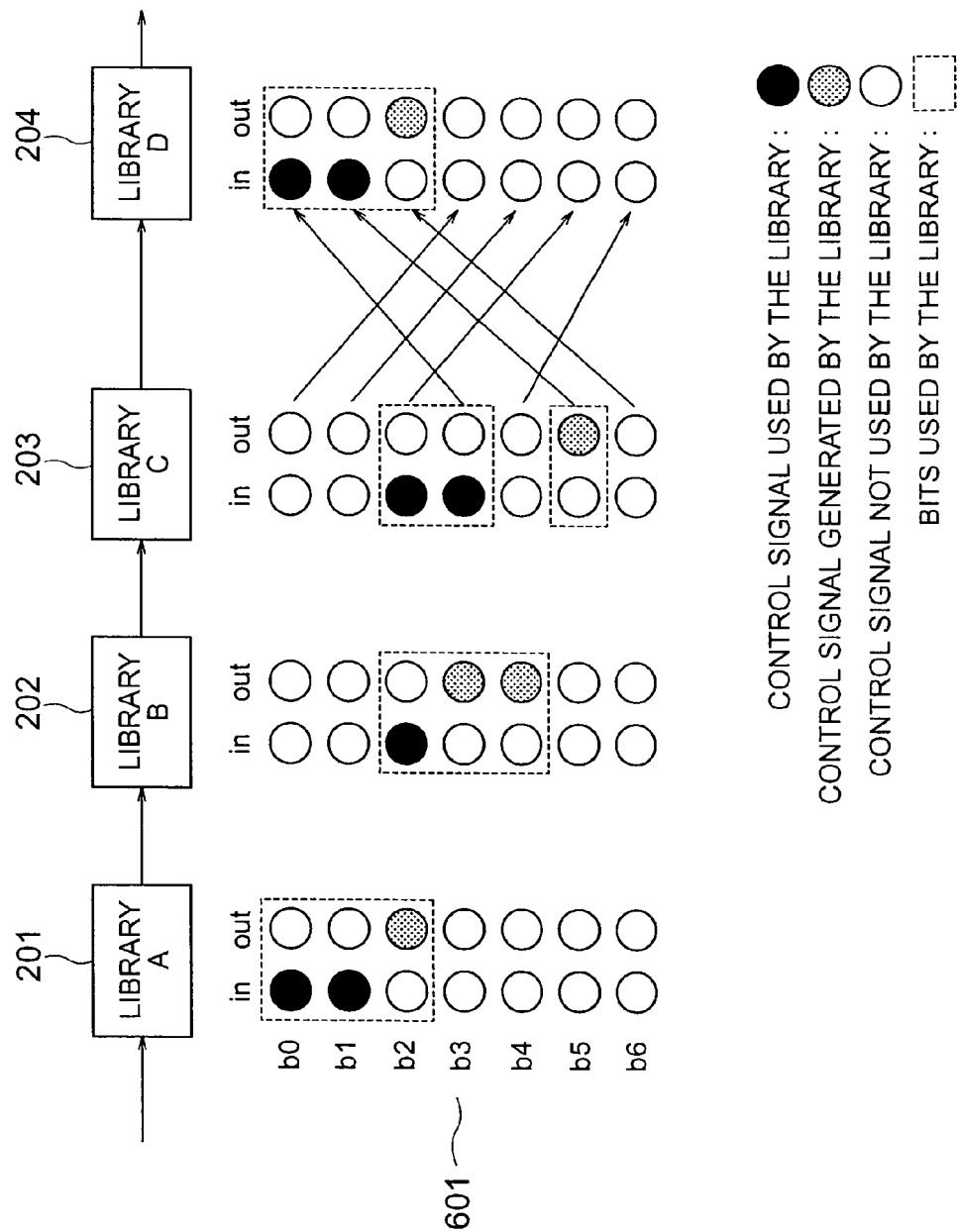
FIG. 7 shows an example of assigning control bits in the second arrangement.

FIG. 7 shows an example of assigning control bits in this arrangement. The explanation as far as the library C 203 is the same as the explanation in FIG. 2. It is assumed that the library A used for the second time wants to use the signal b3 generated in the library B and the signal b5 generated in the library C. However, the control signal bits of the library A used for the first time are assigned to receive the signals at the control bits b0 and b1 and to output a signal from the control bit b2. To avoid this, the selector 603 repositions the control signal issued from the library C into such a control bit array as shown by arrows in FIG. 7. More specifically, the control signals input at the control bits b3, b5 and b6 are exchanged for the signals at the control bits b0, b1 and b2 respectively. The other control signals are also exchanged according to the select information. It is assumed that, after the selector 603 performs exchanging operation on the control signals, the control signals can keep their exclusivity. When the select information to be sent to the selector 603 is suitably set by the CPU 304, a flexibility in the connection between libraries can be secured. Any change of the processing contents of the signal processing library core 602 for the essential operation of the library and change of the interface can be fully avoided.

In this manner, the signal processing library having the second arrangement can secure a flexibility in the connection between libraries and thus can solve the first problem. Even the use of the same library a plurality of times within the same communication system and even the sequential exchange of the libraries, which was not realized in the first arrangement, can be realized.

Embodiment 3

Figure 8:
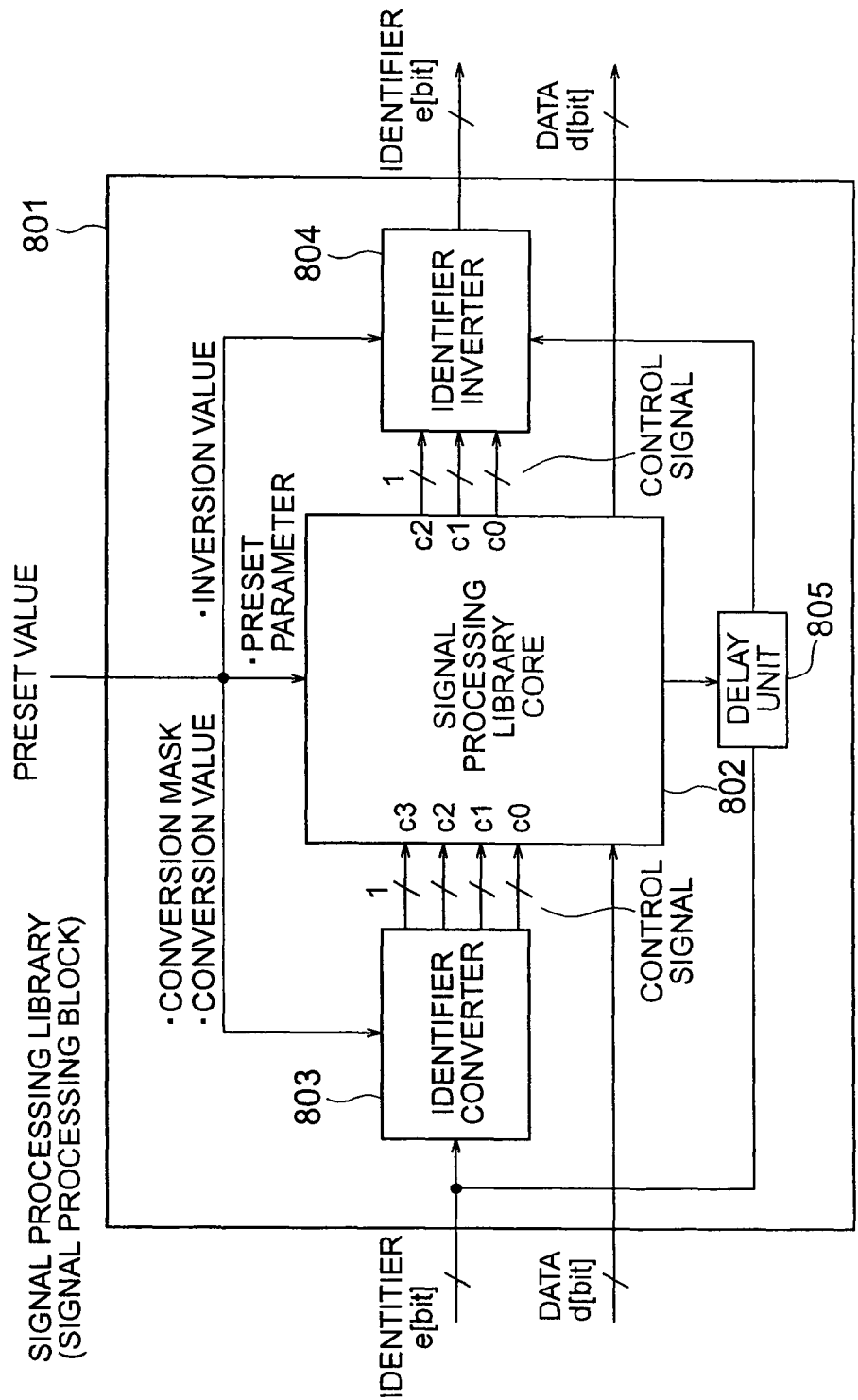
FIG. 8 is a third arrangement of the signal processing library.

FIG. 8 shows a third arrangement of the signal processing library. In this arrangement, an identifier is transmitted between signal processing libraries 801. The identifier is control information including timing information or identification information on the timing. The identifier will be explained more in detail later. The identifier input to the signal processing library 801 is converted by an identifier converter 803 to a control signal including information about control bits necessary for a signal processing library core 802. The conversion assignment is carried out by using a conversion mask and a conversion value. Setting of the conversion mask and value is carried out suitably by the CPU 304, when the communication system to be realized was modified or when the same communication system was used but its encoding system or the like was modified. Control signals issued from the core are converted by an identifier inverter 804 to an identifier and then transmitted to an adjacent library together with the synchronized data. Inversion assignment is carried out by using an inversion value. Setting of the inversion value is also carried out suitably by the CPU 304 similarly to the conversion value and the conversion mask. Under the distributed control, the control signal and data simultaneously input to the signal processing library 801 are required to be always synchronized. To this end, it is required to apply the same delay as a processing delay caused by the signal processing library core even to the control signal. The identifier input to the signal processing library 801 is subjected to a delay by a delay unit 805, and then input to the identifier inverter. The delay amount is assumed to be equal to a processing delay amount caused until the data input to the signal processing library 801 simultaneously with the identifier is output from the signal processing library core 802. As a result, synchronism can be established and kept between the control signal generated in the signal processing library core 802 and the identifier issued from the delay unit 805.

Figure 9:
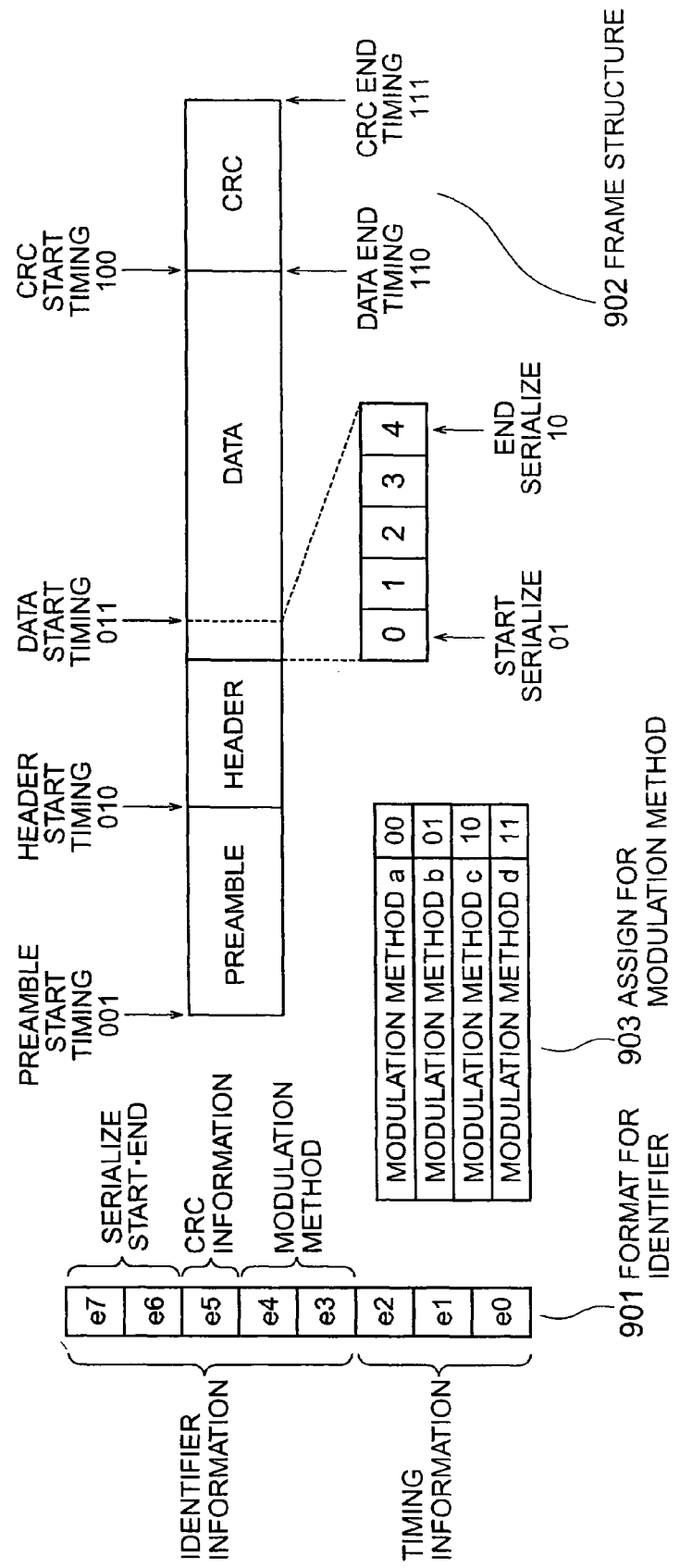
FIG. 9 is a diagram for explaining the assignment of an identifier.

Explanation will now be made as to the details of the identifier. As mentioned above, the identifier includes the timing information and the identification information at the timing. The timing information uses an index at a certain timing in a radio frame or a packet. The control information including the modulation start, spread start, CRC data input start, etc. caused at the index-assigned timing, is known as identification information. An example of identifier assignment in a standard radio communication system is shown in FIG. 9.

In this example, the identifier consists of 8 bits and has a meaning with a collection of these bits. As shown by an identifier format 901 in FIG. 9, the identifier is made up of two parts, wherein e0 to e2 indicate timing, and e3 to e7 indicate identification information at the timing. As shown by a frame structure 902 in FIG. 9, a radio frame for the radio communication system is made up of fields of preamble, header, data, CRC, etc. The frame structure is assumed to conform to the frame structure of a desired communication system to be realized. A timing index of 3 bits is assigned to head or tail of each field. This timing index is used as e0 to e2 of the identifier format. For example, e0e1e2=001 is an index indicative of preamble start timing. Fields e3 to e4 indicate modulation methods, which are assigned as shown by a modulation method assignment 903 in FIG. 9. The field e5 indicates CRC pass/fail information, wherein "0" means pass or success and "1" means failure. Fields e6 and e7 indicate start and end of serialization.

The conversion mask, conversion value, and inversion value for use of the conversion and inversion of the identifier are designed when each signal processing library is installed to each signal processing block, and are set in the FPGA when the library is installed. More specifically, the conversion mask, conversion value, and inversion value are set, for example, based on the fact that what kind of information is included in which bit in an identifier and how to extract the information and input it as a prescribed bit for the corresponding library core. In this method, when reconfiguration is carried out for one signal processing block, it is only required to set, for the corresponding signal processing block, an existing library core, the conversion mask, conversion value, and inversion value for reconfiguration. For the other signal processing blocks whose reconfiguration are unnecessary, it is unnecessary to change the conversion mask, conversion value, and inversion value of their library cores, thus further facilitating library exchange, etc.

An example of start and end of serialization will be explained. A spreading library outputs a spread signal which has bits of a received transmission data spread to a plurality of pieces of data. Identification information indicative of serialize start is attached to data output at the head, and identification information indicative of serialization end is attached to data output at the tail. With it, the head and tail of the data can be correctly recognized.

Figure 10:
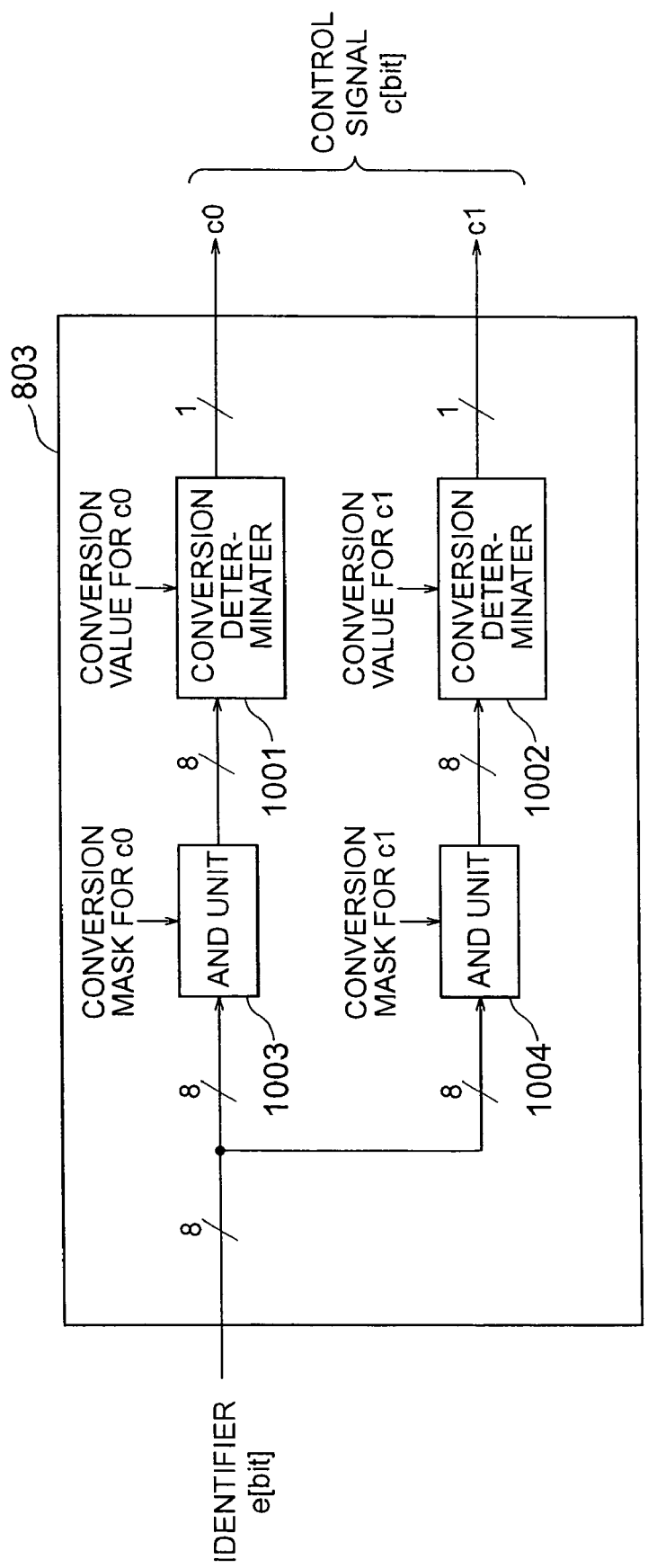
FIG. 10 shows an arrangement of an identifier converter.

FIG. 10 shows an example of the structure of the identifier converter 803. The example shows when the number of necessary input control signal bits is 2 as shown in the library A 201. It is also assumed that an identifier consists of 8 bits as in the communication system of FIG. 9. It is required that the number of identifier bits necessary for the entire communication system be 'e', and the number of control signal bits necessary for the corresponding signal processing library core be 'c'. It is also assumed that the number of conversion mask bits and the number of conversion value bits are the same as identifier bit number 'e', respectively. An AND gate 1003 or 1004 outputs a logical AND of an identifier output to the identifier converter 803 and a conversion mask for each control signal bit. Identifiers issued from AND gates 1003 and 1004 for the respective control signal bits are input to conversion determinators 1001 and 1002, respectively. Each of the conversion determinators 1001 and 1002 determines whether or not the received identifier is equal to the conversion value for each control signal bit; and when determining the an equality therebetween, outputs "1". For example, when the identifier is equal to the c0 conversion value, a relation c0=1 is satisfied. Though two of the conversion determinators 1001 and 1002 and two of the AND gates 1003 and 1004 are illustrated in this structure, the determinators and the AND gates are actually required respectively by a number 'c' corresponding to control signal bits necessary for the signal processing library core 802.

A specific example of converting an identifier to a control signal in identifier converter 803 will be explained. A communication system is assumed to have the same method as described in FIG. 9. In this specific example, in the signal processing library "modulation", an identifier is converted to a control signal using the conversion mask and the conversion value. The modulation-signal processing library core is assumed to discriminate the start of the modulation method 'c' at the control signal bit c0. In this radio communication system, further, it is assumed that the modulation method 'c' is started at the preamble start timing or at the data start timing. Bits [11111101] is set as a c0 conversion mask for the modulation-signal processing library core, and a value [01010001] is set as the c0 conversion value. The c0 AND gate 1004 outputs a logical AND of the identifier input to the identifier converter 803 and the c0 conversion mask. The c0 conversion determinator 1001 outputs "1" when the above output value is equal to the c0 conversion value. As will be seen from FIG. 9, an identifier for the start of the modulation method 'c' at the preamble start time is [01010001], and an identifier for the start of the modulation method 'c' at the data start timing is [01010011]. The values of logical ANDs of the conversion mask [11111101] and the above identifiers are both [01010001]. This value is equal to the c0 conversion value [01010001]. Hence, a relation c0=1 is satisfied at the timing of inputting the above identifier and the modulation method 'c' can be started. When an identifier other than the above identifiers is input to the identifier converter 803, the relation c0=1 is not satisfied. When the conversion mask or the conversion value is devised, it is also possible to assign a plurality of identifiers to a single control bit.

Figure 11:
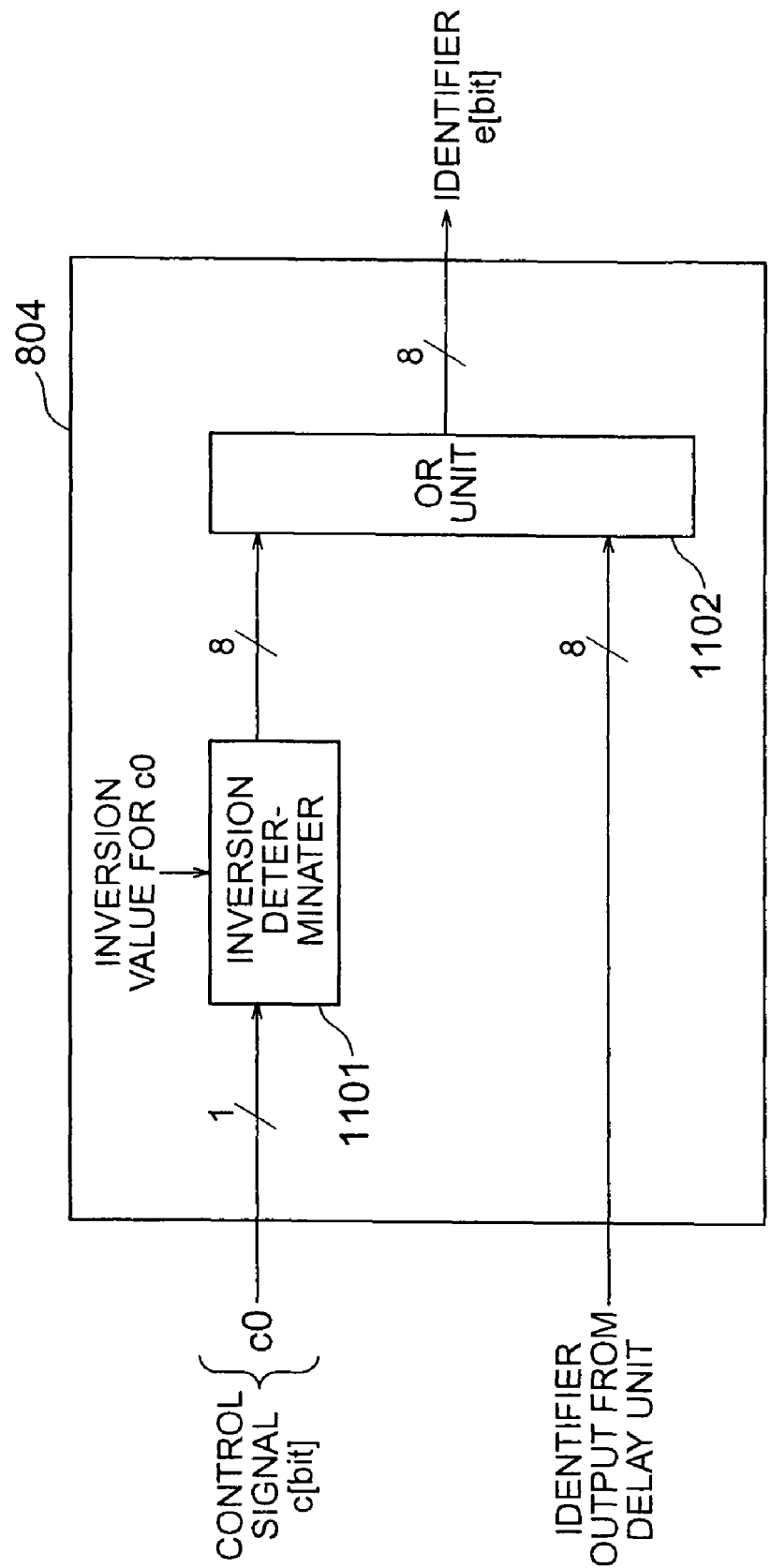
FIG. 11 shows an arrangement of an identifier inverter.

FIG. 11 shows an example of the structure of the identifier inverter 804. The example shows when the number of output control signal bits is "1" as shown in the library A 201. An identifier is assumed to consist of 8 bits as in the communication system of FIG. 9. It is required that the number of identifier bits be 'e' that is necessary for the corresponding communication system, and that the number of control signal bits be 'c' that is necessary for the signal processing library core. It is also assumed that the number of bits of each inversion value is the same as the number 'e' of identifier bits. A control signal issued from the signal processing library core 802 is input to an identifier inverter 804 for control signal bit. The identifier inverter 804, when receiving a control signal of "1", outputs bit inversion values. An OR gate 1104 outputs a logical OR of an identifier issued from the inversion determinator 1101 and a delayed identifier from the identifier converter 803. In this structure, the single inversion determinator 1101 is provided. However, such inversion determinators 1101 are required by a number corresponding to the control signal bits issued from the signal processing library core 802. In other words, when the number of control signal bits issued from the signal processing library core 802 is c=2, a c1 inversion determinator is required in addition to the c0 inversion determinator. The control signal c1 is input to the c1 inversion determinator, and an 8-bit identifier issued from the c1 inversion determinator is input to the OR gate 1102 in parallel with the 8-bit identifier issued from the c0 inversion determinator.

A specific example of converting a control signal to an identifier in the identifier inverter 804 will be explained. This example shows how to convert a control signal to an identifier using an inversion value in the signal processing library CRC. The identifier is assumed to consist of 8 bits and the control signal is to consist of 3 bits. In a reception mode of the radio communication system, the CRC signal processing library compares a CRC code calculated based on received data with a CRC field of the received data. When finding a coincidence therebetween, the CRC signal processing library is assumed to output c2=0, and otherwise, the library is assumed to output c2=1. A value [00100000] is set as an inversion value for the control signal c2 of the CRC signal processing library core. The inversion determinator 1101 outputs the c2 inversion value when c2=1. An OR gate 1104 outputs a logical OR of an output value from the c0 and c1 inversion determinators and an identifier issued from the delay unit 805. When the identifier issued from the delay unit 805 is [00000111], an output from the OR gate 1104 is an identifier [00100111] meaning a CRC failure at the CRC end timing. The identifier is sequentially transmitted to the connected libraries together with the data.

In this example, the conversion determinators 1001 and 1002 and the AND gates 1003 and 1004 in FIG. 10 are required, and the necessary number of such an inversion determinators 1101 in FIG. 11 corresponds to control signal bit number 'c' necessary for the signal processing library. Such an arrangement may be possible that the conversion determinator, the AND gate, and the inversion determinator are provided respectively by 1, and that the conversion mask, the conversion value, and the inversion value for each bit are sequentially switched.

When the values of the conversion mask and inversion value are suitably set, a high flexibility in the connection between libraries can be obtained. Any modification of the library core for performing the essential operation of the corresponding library is not required at all. This arrangement, which is different from the first and second arrangement, eliminates the need for exclusively arranging all the control signals and requires control signals necessary only for the corresponding signal processing library core. From this viewpoint, this arrangement is excellent even in the expansibility to a novel system.

The third arrangement requires the identifier converter and the identifier inverter for mutual conversion between the control signal and the identifier. However, this can be realized by combining simple AND and OR logical circuits. Thus the third arrangement can realize a mounting surface area smaller than when the selector is used in the second arrangement. Further, the identifier consists of 'y' bits to which a maximum $2^y$ of control information can be assigned. Thus this arrangement can be realized with a wiring scale smaller than when a control signal of 1 bit having only a single amount of information is transmitted between libraries. In the example shown in FIG. 9, the identifier consists of 8 bits which indicate 32 of statuses. When the control signal is transmitted directly between libraries, that is, in the first and second arrangement, the number of such control signals is c=32 and its wiring scale is increased about 4 times. In a general radio communication system, the identification information start/end timing is, in many cases, limited to header or data start/end timing or the like even in a long radio frame. For this reason, a less number of bits necessary for timing index can be, in many case, required.

In the second and third arrangements; the selector, identifier converter, and identifier inverter are required. Therefore, the larger the number of control signals to be repositioned, converted, repositioned and inverted is; the larger the scale of the selector, identifier converter, and identifier inverter is. From the above consideration, such fourth and fifth arrangement can be possible that control signals necessary for substantially all signal processing libraries are exclusively positioned, and are not repositioned at the selector, nor converted at the identifier converter and identifier inverter.

Embodiment 4

Figure 12:
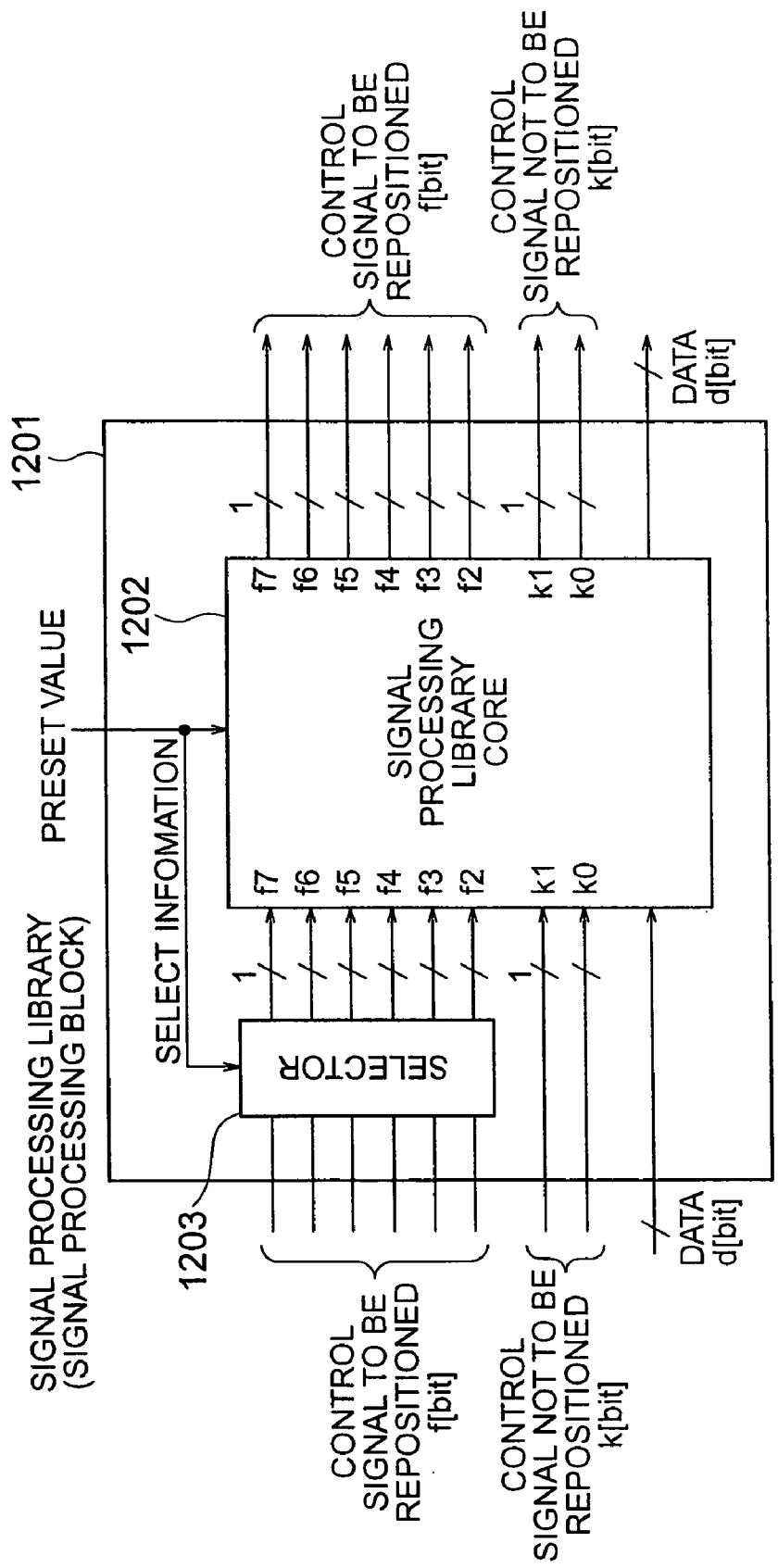
FIG. 12 is a fourth arrangement of the signal processing library.

FIG. 12 shows a fourth arrangement of the signal processing library, which is the same as the second arrangement, except for function and operation to be explained later. Control signals to be repositioned and control signals not to be repositioned are transmitted between signal processing libraries. Control signals to be repositioned are repositioned at a selector 1203 as in the second arrangement, but control signals not to be repositioned are directly input to a signal processing library core 1202 not via the selector 1203. Under distributed control, the control signal is always synchronized with data, and the control signal indicative of state or information about the data is transmitted. For example, a control signal indicative of the fact that the data is valid or invalid is necessary for all the signal processing libraries. When such a control signal is not repositioned nor converted nor inverted, and a control bit is exclusively prepared, therefore, the structure of the selector 1203 can be reduced.

Embodiment 5

Figure 13:
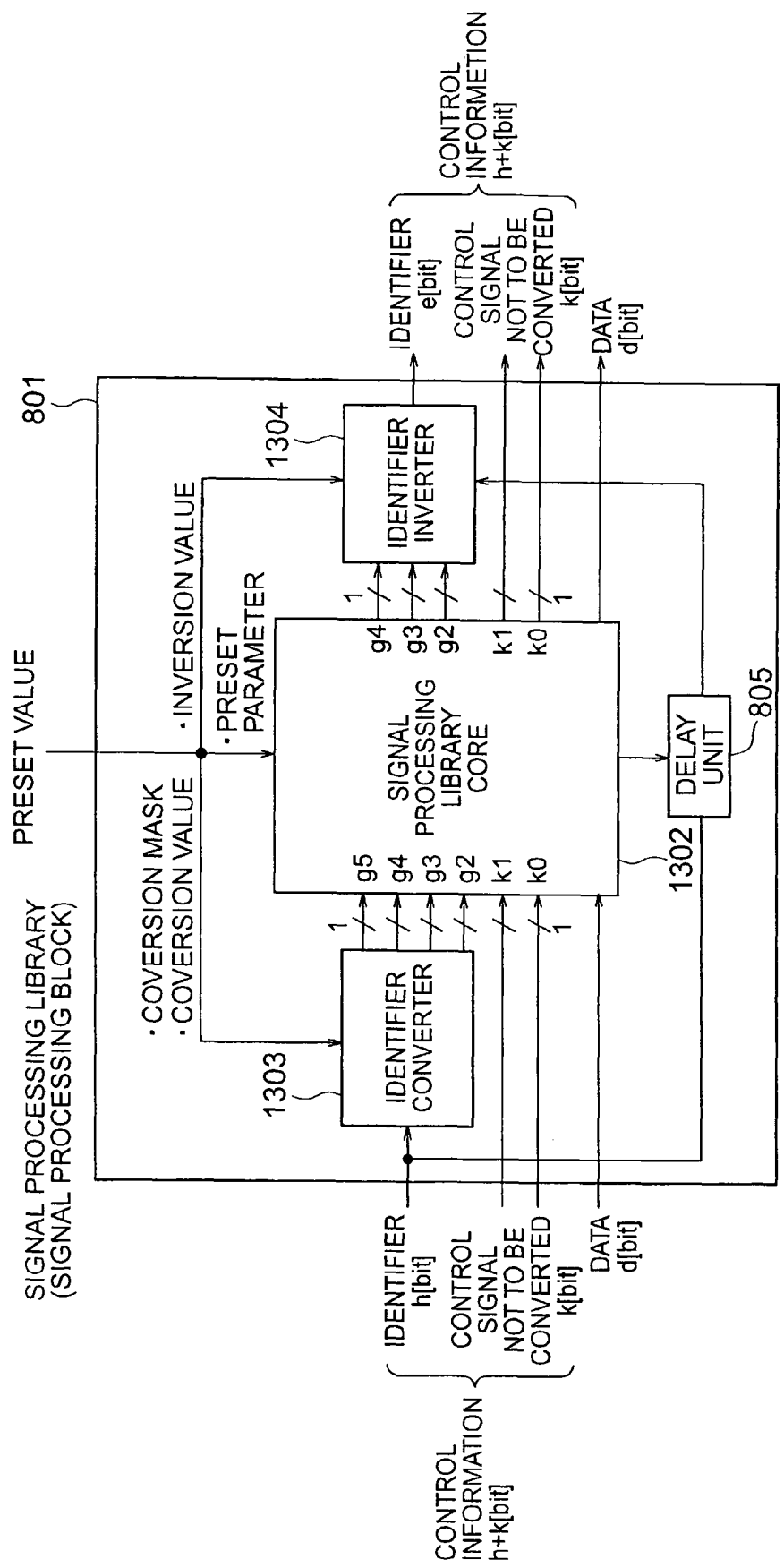
FIG. 13 is a fifth arrangement of the signal processing library.

FIG. 13 shows a fifth arrangement of the signal processing library, which is the same as the third arrangement except for function and operation to be explained later. Identifiers and control signals not to be converted to identifiers are transmitted between signal processing libraries. The identifiers are processed in exactly the same manner as in the third arrangement. The control signals not to be converted are input directly to the signal processing library core 1302 not via an identifier converter 1303, and output directly from a signal processing library 1301 not via an identifier inverter 1304. The identifiers, the control signals not to be converted and data, input simultaneously to the signal processing library 1301 are synchronized even during processing in the signal processing library, and are simultaneously output from the signal processing library 1301. In this arrangement, such control signals necessary for all the signal processing libraries as mentioned above in the fourth arrangement are not converted nor inverted. When control bits are prepared for these control signals, the structure sizes of the identifier converter 1303 and identifier inverter 1304 can be decreased.

Embodiment 6

A connection diagram for libraries for use in a radio communication system will be shown. The connection of the libraries is developed within the digital signal processor 303. Each one of the libraries corresponds to each one of signal processing blocks, and the contents of each library is executed by each corresponding signal processing block. Explanation will now be made as to a specific example of transmission/reception systems conforming to the 802.11b specifications as radio LAN specifications and advanced PHD. It is assumed that the signal processing libraries developed in the digital signal processor 303 can have any of the first to fifth arrangements.

Figure 14:
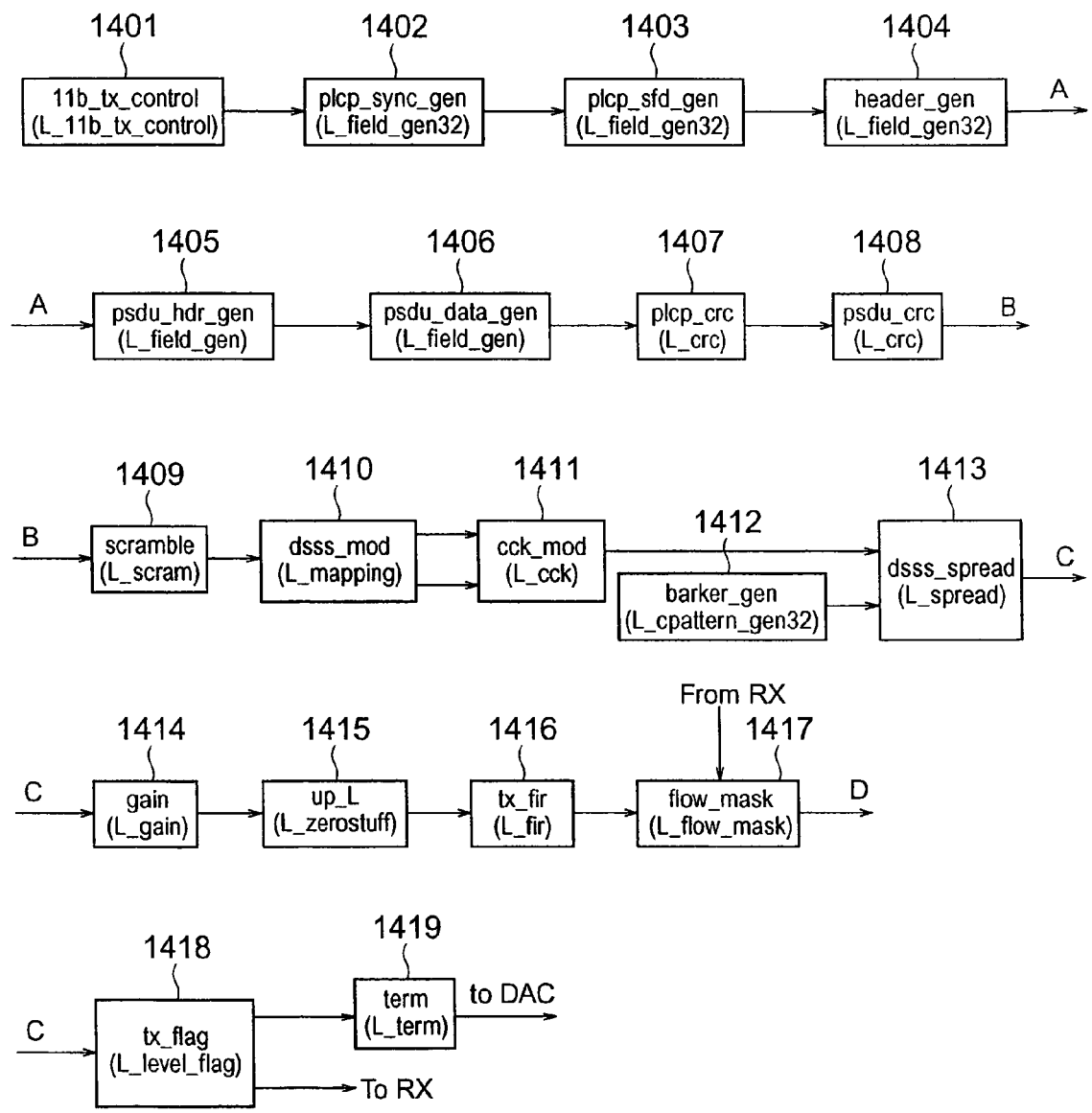
FIG. 14 shows a wiring diagram of an 802.11b transmission system library.
Figure 15:
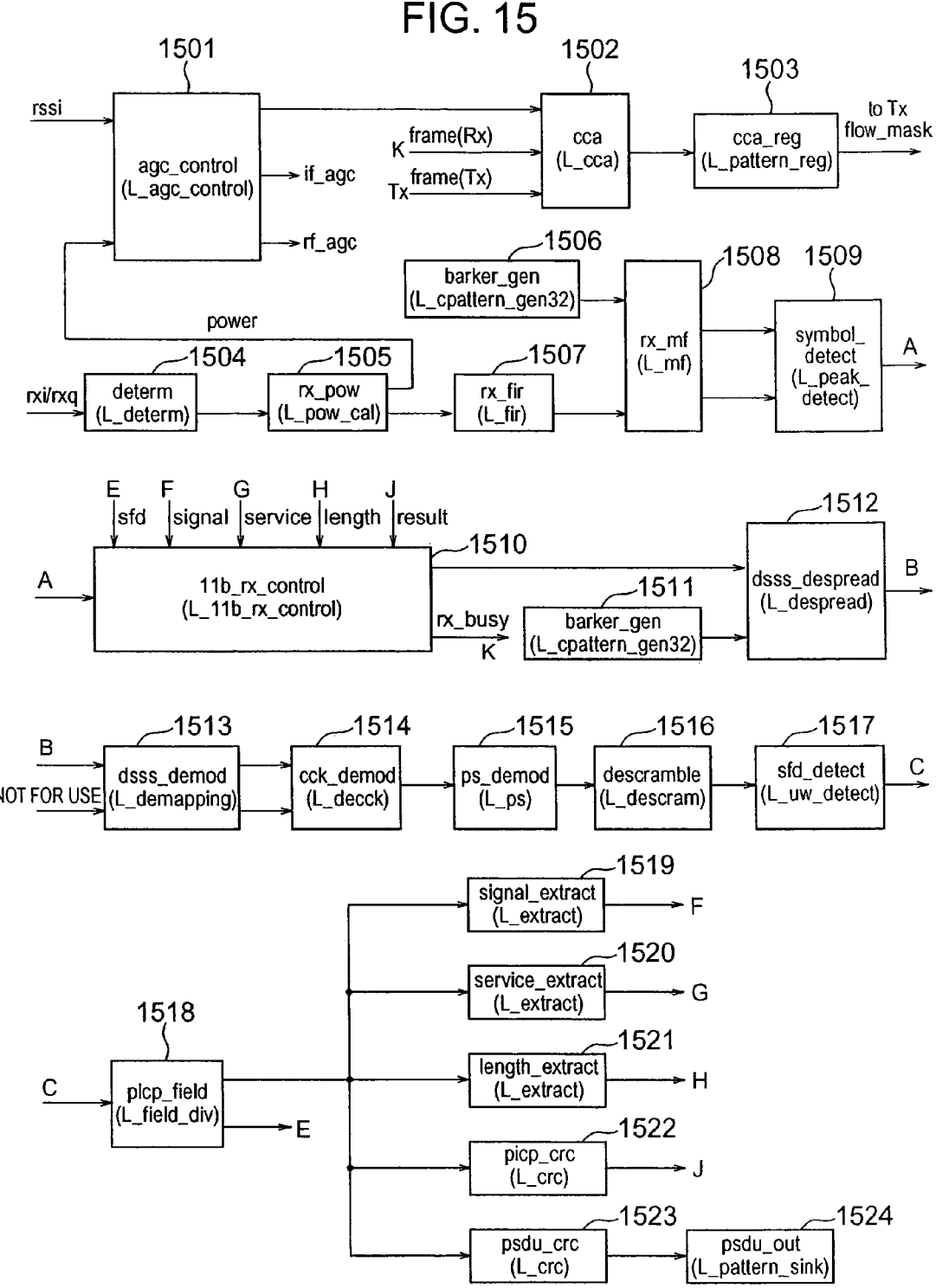
FIG. 15 shows a wiring diagram of an 802.11b reception system library.
Figure 16:
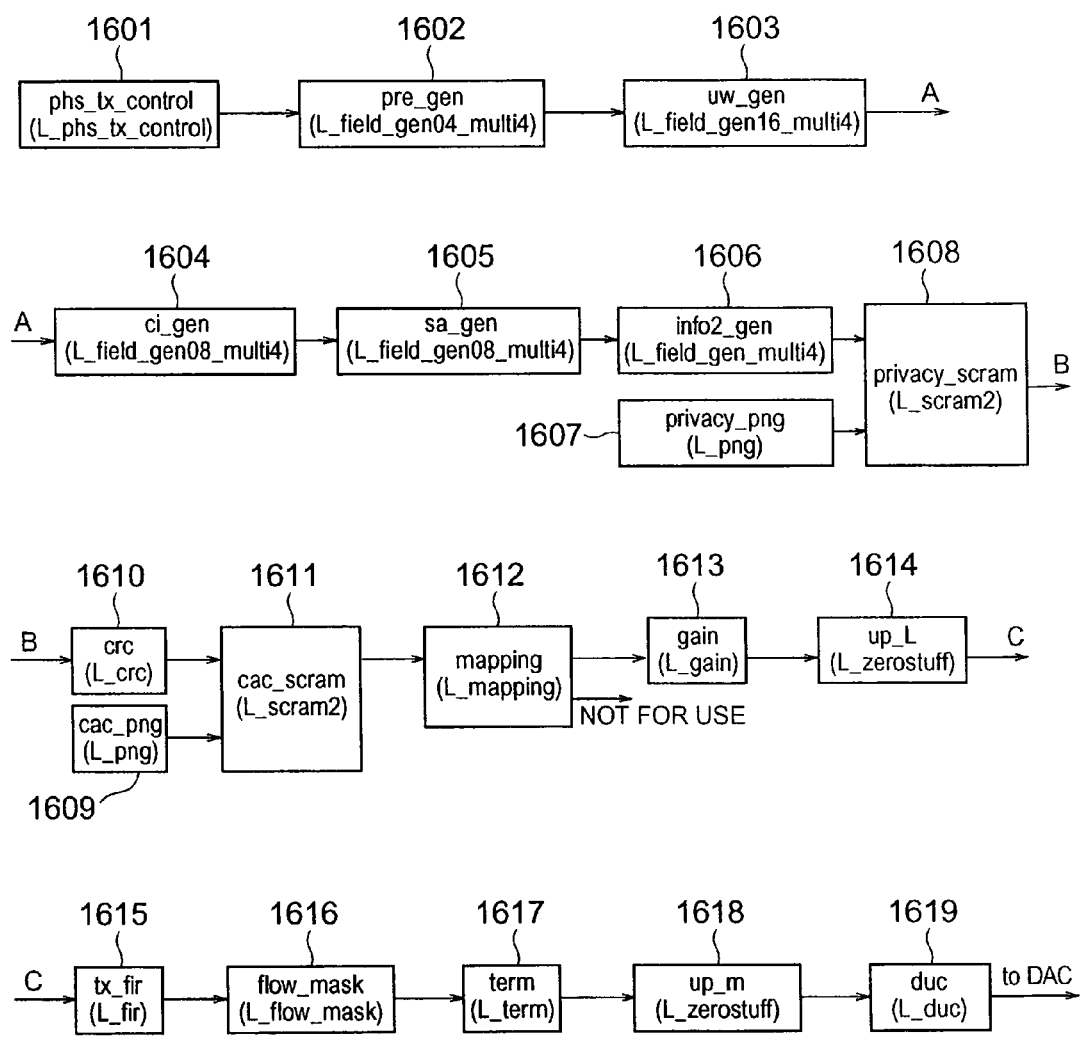
FIG. 16 shows a wiring diagram of an advanced PHS transmission system.
Figure 17:
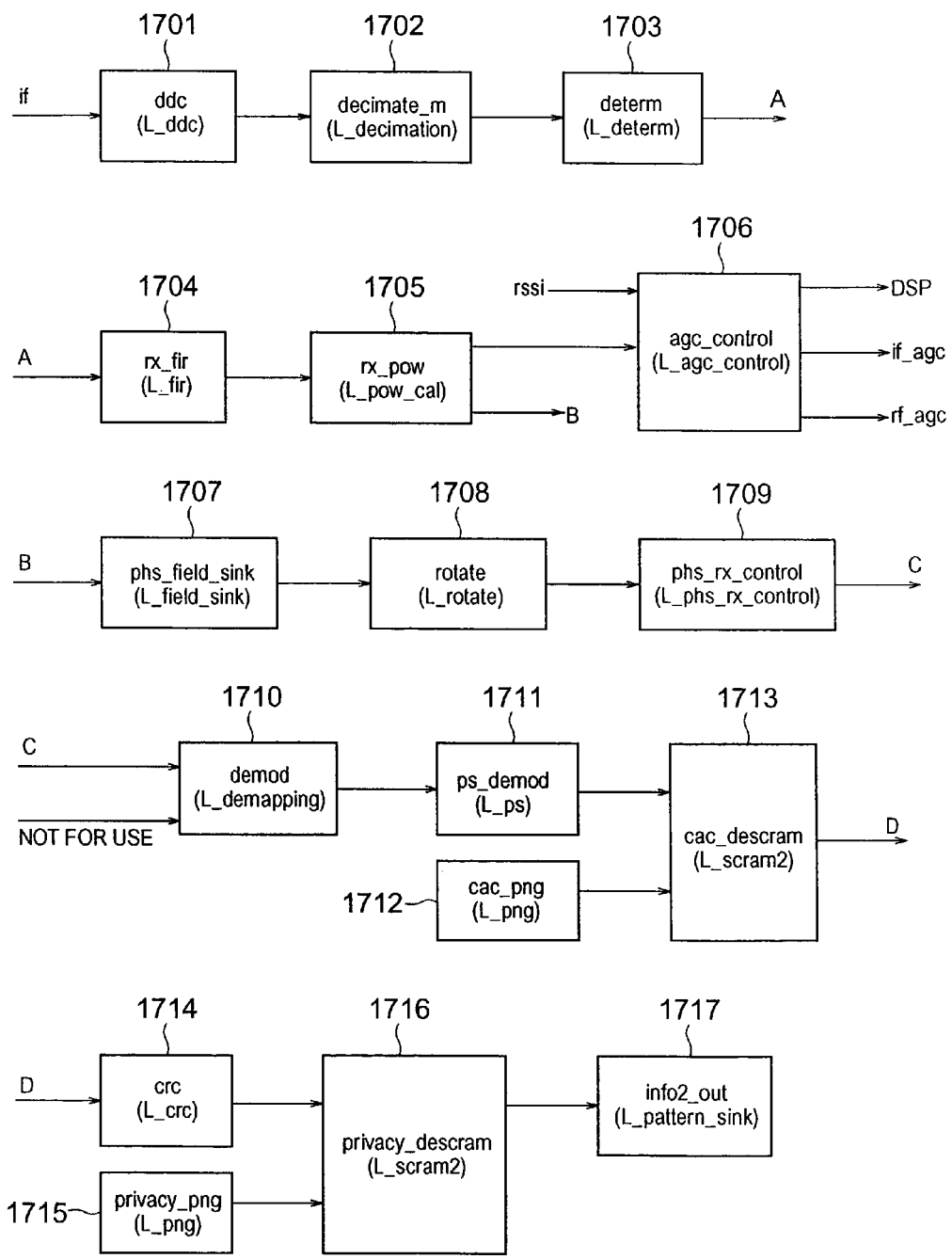
FIG. 17 shows a wiring diagram of an advanced PHS reception system.

FIG. 14 shows a 802.11b transmission system, FIG. 15 a 802.11b reception system, FIG. 16 an advanced PHS transmission system, and FIG. 17 a connection example of libraries in an advanced PHS reception system. In FIGS. 14 to 17, for simplicity of explanation, only the order of arranging libraries is shown and details of wiring information on control signals and data are not illustrated. In actuality, transfer between such control signals, identifiers and data as shown in the first to fifth arrangements is carried out. In FIGS. 14 to 17, a tile indicative of a function in the communication system is shown in an upper row in each library and a library title is shown in a lower row in each library.

Explanation will be made as to functions of libraries used in each communication system.

L__11b_tx_control (1401): generates a control signal for 802.11b transmission system L_field_gen32 (1402, 1403, 1404): A pattern generator up to 32-bit length.

L_field_gen (1405, 1406): Generates an arbitrary length of pattern.

L_crc (1407, 1408): CRC encodes, CRC decodes.

L_scram (1409): Scrambles one input.

L_mapping (1410, 1612): Modulation such as BPSK, QPSK, 16QAM, etc.

L_cck (1411): Modulation in 802.11b CCK.

L_cpattern_gen32 (1412, 1506, 1511): A complex pattern generator up to 32-bit length.

L_spread (1413): Spreads using a spread code.

L_gain (1414, 1613): Outputs an input signal with a set gain.

L_zerostuff (1415, 1614): Inserts "0"s corresponding to a specified number between data.

L_fir (1416, 1507, 1615, 1704): An FIR filter.

L_flow_mask (1417, 1616): Performs backward control to stop subsequent stages of libraries.

L_level_flag (1418): Outputs "1" only when flag is ON.

L_term (1419, 1617): Converts clock rate and performs end processing on a control signal.

L_agc_control (1501, 1706): Performs automatic gain control based on a received power or RSSI.

L_cca (1502): Controls CCA (Clear Channel Assessment) for 11b.

L_pattern_reg (1503): Holds input data in a register when the data is valid.

L_determ (1504, 1703): Converts a clock rate.

L_pow_cal (1505, 1705): Calculates power.

L_mf (1508): A matched filter.

L_peak_detect (1509): Calculates a peak value of input data.

L__11b_rx_control (1510): Generates a control signal for the 802.11b reception system.

L_despread (1512): Despreads.

L_demapping (1513, 1710): Demodulates BPSK, QPSK, etc.

L_decck (1514): Demodulates 802.11b CCK.

L_ps (1515, 1711): Converts a parallel signal to a serial signal.

L_descram (1516): Descrambles one input.

L_uw_detect (1517): Detects a specified unique word.

L_field_div (1518): Attaches start/end control signals to a field to be desired to detect and then outputs it.

L_extract (1519 to 1523): Extracts a field.

L_pattern_sink (1524, 1717): Outputs a specified section to a field.

L_phs_tx_control (1601): Generates a control signal for an advanced PHS transmission system.

L_field_gen04_multi4 (1602): A pattern generator of a 4-bit length for 4 slots.

L_field_gen16_multi4 (1603): A pattern generator of a 16-bit length for 4 slots.

L_field_gen08_multi4 (1604, 1605): A pattern generator of a 8-bit length for 4 slots.

L_field_gen_multi4 (1606): Generates an arbitrary length of pattern for 4 slots.

L_png (1607, 1609, 1712, 1715): A PN-series generator.

L_scram2 (1611, 1713, 1716): Scrambles 2 inputs.

L_duc (1619): Digitally up-converts and orthgonally modulates on a frequency axis.

L_ddc (1701): Digitally down-converts and orthgonally modulates on a frequency axis.

L_decimation (1702): Reduces a sampling rate using a CIC filter.

L_field_sink (1707): Writes a data field in a memory.

L_rotate (1708): Corrects phase.

L_phs_rx_control: Generates a control signal for an advanced PHS reception system.

When these libraries are combined and connected and parameters inherent in each communication system are set in the libraries, each communication system is realized. In libraries used in each communication system, parameters are set for each library according to the specifications of the communication system. For example, even for the same L_field_gen32, parameters are set for the library 'plcp_sync_gen' 1402 so as to generate a SYNC field for a 802.11b PLCP, and parameters are set for the library 'plcp_sfd_gen' 1403 so as to generate an SFD field for the 802.11b PLCP.

When such a reconfigurable device as an FPGA is used, basically, configuration data is prepared not for each library but for the entire communication system. That is, when the communication system is switched, even the presence of a library commonly used before and after the switching causes, in many cases, the configuration data for the entire communication system including the library to be downloaded for its reconfiguration. When such a device as dynamically configurable is employed, however, the common part can be considered to be excluded in its reconfiguration.

Examination will be made for a library reusability. As shown in FIG. 14, a total of 19 libraries are used in the 802.11b reception system. Since the libraries of 'L_field_gen32', 'L_field_gen' and 'L_crc' ing the 19 libraries are used a plurality of times, the number of libraries actually developed is 15. The total number of libraries used for the 802.11b transmission system is 24. Since 4 of the 24 libraries are already developed for the 802.11b transmission system and the library 'L_extract' developed for the 802.11b reception system is used a plurality of times, the number of libraries actually developed for the 802.11b transmission system is 17. Similarly, the total number of libraries used for the advanced PHS transmission system is 19, and the number of newly developed libraries is 8. The total number of libraries used for the advanced PHS reception system is 17 and the number of newly developed libraries is 5. When a rate of a subtraction of the newly developed library number from the total library number with respect to the total library number is defined as a library reusable rate, the library reusable rate is 26% for the 802.11b reception system, 29% for the 802.11b transmission system, 58% for the advanced PHS transmission system, and 71% for the advanced PHS reception system. In other words, as the number of communication systems to be developed increases, the reusable rate is increased. Thus the number of newly developed steps and cost can be reduced.

Elements shown in FIGS. 14 to 17 will be explained below.

Reference numeral 1401 denotes an 11 transmission controller, numeral 1402 denotes a SYNC field generator, 1403 denotes an SFD field generator, 1404 a header generator, 1405 a PSDU header generator, 1406 a PSDU data generator, 1407 a PLCP_CRC encoder, 1408 a PSDU_CRC decoder, 1409 a scrambler, 1410 a modulator, 1411 a CCK modulator, 1412 a Barker series generator, 1413 a spreader, 1414 a gain adjuster, 1415 an up-converter, 1416 an FIR filter, 1417 a forced backward controller, 1418 a transmission flag generator, 1419 a transmission system clock rate converter.

Reference numeral 1501 denotes an AGC controller, numeral 1502 denotes a CCA controller, 1503 a CCA control output, 1504 reception system clock rate converter, 1505 a power calculator, 1506 a Barker series generator, 1507 an FIR filter, 1508 a matched filter, 1509 a symbol detector, 1510 a 11b reception system controller, 1511 a Barker series generator, 1512 a despreader, 1513 a demodulator, 1514 a CCK demodulator, 1515 a parallel/serial converter, 1516 a descrambler, 1517 an SFD detector, 1518 a PLCP field detector, 1519 a SIGNAL file extractor, 1520 a SERVICE field detector, 1521 a LENGTH field extractor, 1522 a PLCP_CRC decoder, 1523 a PSDU_CRC decoder, 1524 a PSDU output.

Reference numeral 1601 denotes an advanced PHS transmission system controller, numeral 1602 denotes a preamble generator, 1603 denotes a synchronization word generator, 1604 channel type generator, 1605 an SACCH generator, 1606 a service channel generator, 1607 a secret PN series generator, 1608 a secret scrambler, 1609 a CAC PN-series generator, 1610 a CRC encoder, 1611 a CAC scrambler, 1612 a modulator, 1613 a gain adjuster, 1614 an up-converter, 1615 an FIR filter, 1616 a forced backward controller, 1617 a transmission system clock rate converter, 1618 an up-converter, 1619 an up-converter/orthogonal modulator.

Reference numeral 1701 denotes a down-converter/orthogonal demodulator, numeral 1702 denotes a down-converter, 1703 denotes a reception system clock rate converter, 1704 an FIR filter, 1705 a power calculator, 1706 an AGC controller, 1707 a PHS data field output, 1708 a phase corrector, 1709 a PHS reception system controller, 1710 a demodulator, 1711 a parallel/serial converter, 1712 a CAC PN-series generator, 1713 a CAC descrambler, 1714 a CRC decoder, 1715 a secret PN-series generator, 1716 a secret descrambler, 1717 a service channel output.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A radio communication apparatus comprising:
a radio modem for converting a reception signal having a radio frequency band to a base band signal;
a signal processor for processing the base band signal of the reception signal, the signal processor including a plurality of reconfigurable reception signal processing blocks arranged in a sequential order; and
a processing unit for processing a protocol, wherein each of said reception signal processing blocks is supplied with reception signal data included in the reception signal and one or more control signal bits of a plurality of control signal bits, each control signal bit being exclusively assigned for transmitting a respective control signal of a plurality of control signals required by said reception signal processing blocks, each of the one or more control signal bits supplied to each reception signal processing block being transmitted from either the radio modem or another reception signal processing block that precedes the reception signal processing block to which the control signal bit is supplied in the sequential order, wherein each of said reception signal processing blocks includes a signal processing block core for processing the reception signal data included in the reception signal by using a corresponding necessary set of the one or more control signal bits supplied to the signal processing block, and wherein each of said reception signal processing blocks transmits any control signal bits of the one or more control signal bits supplied to the reception signal processing block and not included in the corresponding necessary set used in the signal processing block core to either the processing unit or another reception signal processing block that follows the reception signal processing block in the sequential order.

2. A radio communication apparatus according to claim 1, wherein at least one of said reception signal processing blocks includes a format processor for converting the one or more control signal bits supplied to the reception signal processing block into a control signal bit array required for processing by the signal processing block core of the reception signal processing block.

3. A radio communication apparatus comprising:
a radio modem for converting a transmission signal having frequencies in a base band to a radio frequency band signal;
a signal processor for processing the transmission signal having frequencies in the base band, the signal processor including a plurality of reconfigurable transmission signal processing blocks arranged in a sequential order; and
a processing unit for processing a protocol,
wherein each of said transmission signal processing blocks is supplied with transmission signal data included in the transmission signal and one or more control signal bits of a plurality of control signal bits, each control signal bit being exclusively assigned for transmitting a respective control signal of a plurality of control signals required by said transmission signal processing blocks, each of the one or more control signal bits supplied to each transmission signal processing block being transmitted from either the processing unit or another transmission signal processing block that precedes the transmission signal processing block to which the control signal bit is supplied in the sequential order,
wherein each of said transmission signal processing blocks includes a signal processing block core for processing the transmission signal data included in the transmission signal by using a corresponding necessary set of the one or more control signal bits supplied to the signal processing block, and
wherein each of said transmission signal processing blocks transmits any control signal bits of the one or more control signal bits supplied to the transmission signal processing block and not included in the corresponding necessary set used in the signal processing block core to either the radio modem or another transmission signal processing block that follows the transmission signal processing block in the sequential order.

4. A radio communication apparatus according to claim 3, wherein at least one of said transmission signal processing blocks includes a format processor for converting the one or more control signal bits supplied to the transmission signal processing block into a control signal bit array required for processing by the signal processing block core of the transmission signal processing block.

5. A radio communication apparatus comprising:
a radio modem for converting a reception signal having a radio frequency band to a base band signal;
a signal processor for processing the base band signal of the reception signal, the signal processor including a plurality of reconfigurable reception signal processing blocks arranged in a sequential order; and
a processing unit for processing a protocol,
wherein each of said reception signal processing blocks is supplied with reception signal data included in the reception signal and an identifier which indicates control information required by the reception signal processing blocks that includes a plurality of types of information, the identifier being supplied to all of the reception signal processing blocks in a common format, the identifier being supplied to each reception signal processing block from either the radio modem or another reception signal processing block that precedes the reception signal processing block to which the identifier is supplied in the sequential order,
wherein each of said reception signal processing blocks includes a signal processing block core for processing the reception signal data included in the reception signal by using a corresponding necessary set of control signal bits of a plurality of control signal bits supplied to the signal processing block, and
wherein the plurality of types of information includes timing information indicative of timing on a radio communication frame as an index and identification information, the identification information being indicative of starts and ends of radio signal processing according to the timing information and other information required by the reception signal processing blocks, the identification information including start and end of demodulation and modulation methods, start and end of spread, encoding and decoding types, start and end of encoding and decoding, scrambling system type, start and end of the scrambling, a Cyclic Redundancy Check (CRC) system type, start and end of CRC, CRC pass/fail information, start and end of serialization when a single piece of data is input and a plurality of pieces of data are serially output, and start of an operation end indicating ending of each signal processing operation.

6. A radio communication apparatus comprising:
a radio modem for converting a transmission signal having frequencies in a base band to a radio frequency band signal;
a signal processor for processing the transmission signal having frequencies in the base band, the signal processor including a plurality of reconfigurable transmission signal processing blocks arranged in a sequential order; and
a processing unit for processing a protocol,
wherein each of said transmission signal processing blocks is supplied with transmission signal data included in the transmission signal and an identifier which indicates control information required by the transmission signal processing blocks that includes a plurality of types of information, the identifier being supplied to all of the transmission signal processing blocks in a common format, the identifier being supplied to each transmission signal processing block from either the processing unit or another transmission signal processing block that precedes the transmission signal processing block to which the identifier is supplied in the sequential order, wherein each of said transmission signal processing blocks includes a signal processing block core for processing the transmission signal data included in the transmission signal by using a corresponding necessary set of control signal bits of a plurality of control signal bits supplied to the signal processing block, and wherein the plurality of types of information includes timing information indicative of timing on a radio communication frame as an index and identification information, the identification information being indicative of starts and ends of radio signal processing according to the timing information and other information required by the transmission signal processing blocks, the identification information including start and end of demodulation and modulation methods, start and end of spread, encoding and decoding types, start and end of encoding and decoding, scrambling system type, start and end of the scrambling, a Cyclic Redundancy Check (CRC) system type, start and end of CRC, CRC pass/fail information, start and end of serialization when a single piece of data is input and a plurality of pieces of data are serially output, and start of an operation end indicating ending of each signal processing operation.

* * * * *